US010162142B2

(12) United States Patent
Alston et al.

(10) Patent No.: US 10,162,142 B2
(45) Date of Patent: *Dec. 25, 2018

(54) FIBER OPTIC CLOSURE

(71) Applicant: CommScope Technologies LLC, Hickory, NC (US)

(72) Inventors: Eric E. Alston, Fuquay-Varina, NC (US); Daniel B. Hangebrauck, Garner, NC (US); Jack Smith, Garner, NC (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/854,140

(22) Filed: Dec. 26, 2017

(65) Prior Publication Data

US 2018/0203200 A1 Jul. 19, 2018

Related U.S. Application Data

(60) Continuation of application No. 15/582,894, filed on May 1, 2017, now Pat. No. 9,864,157, which is a (Continued)

(51) Int. Cl.
*G02B 6/44* (2006.01)
*G02B 6/255* (2006.01)
(Continued)

(52) U.S. Cl.
CPC ......... *G02B 6/4442* (2013.01); *G02B 6/2555* (2013.01); *G02B 6/2558* (2013.01); *G02B 6/2804* (2013.01); *G02B 6/3874* (2013.01); *G02B 6/3897* (2013.01); *G02B 6/4439* (2013.01); *G02B 6/4444* (2013.01); (Continued)

(58) Field of Classification Search
CPC .. G02B 6/2558; G02B 6/3897; G02B 6/4442; G02B 6/4454; G02B 6/4471
See application file for complete search history.

(56) References Cited

U.S. PATENT DOCUMENTS 5,059,748 A 10/1991 Allen et al.
5,185,845 A 2/1993 Jones
(Continued)

FOREIGN PATENT DOCUMENTS

EP 0 267 028 A2 11/1987
KR 1998-703325 10/1998

OTHER PUBLICATIONS

International Search Report and Written Opinion for PCT/US2012/05429 dated Aug. 27, 2013.

*Primary Examiner* — Daniel Petkovsek
(74) *Attorney, Agent, or Firm* — Merchant & Gould P.C.

(57) ABSTRACT

A fiber optic communications arrangement includes a closure with an interior volume; the closure including at least one cable through-port in communication with the interior volume; and an expansion component attached to an exterior portion of the closure and having an interior region in communication with the closure interior volume. The expansion component includes ruggedized fiber optic adapters mounted thereto. Each of the ruggedized fiber optic adapters includes at least one connector port for receiving ruggedized fiber optic connectors.

5 Claims, 27 Drawing Sheets

Related U.S. Application Data division of application No. 15/289,459, filed on Oct. 10, 2016, now abandoned, which is a continuation of application No. 14/716,347, filed on May 19, 2015, now abandoned, which is a division of application No. 14/495,110, filed on Sep. 24, 2014, now Pat. No. 9,057,858, which is a division of application No. 13/397,884, filed on Feb. 16, 2012, now Pat. No. 8,861,919.

(60) Provisional application No. 61/468,405, filed on Mar. 28, 2011, provisional application No. 61/443,501, filed on Feb. 16, 2011.

(51) Int. Cl.
  *G02B 6/28* (2006.01)
  *G02B 6/38* (2006.01)

(52) U.S. Cl.
  CPC ......... *G02B 6/4454* (2013.01); *G02B 6/4471* (2013.01); *Y10T 29/49002* (2015.01); *Y10T 29/49716* (2015.01)

(56) References Cited

U.S. PATENT DOCUMENTS

| | | | |
|---|---|---|---|
| 5,323,480 A | 6/1994 | Mullaney et al. | |
| 5,446,823 A | 8/1995 | Bingham et al. | |
| 5,495,549 A * | 2/1996 | Schneider | G02B 6/4446 385/134 |
| 5,572,617 A | 11/1996 | Bernhardt et al. | |
| 5,602,954 A | 2/1997 | Nolf et al. | |
| 5,758,004 A | 5/1998 | Alarcon et al. | |
| 5,777,268 A | 7/1998 | Allen et al. | |
| 6,304,707 B1 | 10/2001 | Daems et al. | |
| 6,539,160 B2 | 3/2003 | Battey et al. | |
| 6,579,014 B2 | 6/2003 | Melton et al. | |
| 6,899,467 B2 | 5/2005 | McDonald et al. | |
| 6,934,457 B2 | 8/2005 | Vincent et al. | |
| 7,013,074 B2 | 3/2006 | Battey et al. | |
| 7,090,406 B2 | 8/2006 | Melton et al. | |
| 7,120,347 B2 | 10/2006 | Blackwell, Jr. et al. | |
| 7,264,402 B2 | 9/2007 | Theuerkorn et al. | |
| 7,266,244 B2 | 9/2007 | Mihcak et al. | |
| 7,292,763 B2 | 11/2007 | Smith et al. | |
| 7,346,254 B2 | 3/2008 | Kramer et al. | |
| 7,376,322 B2 | 5/2008 | Zimmel et al. | |
| 7,376,323 B2 | 5/2008 | Zimmel | |
| 7,400,813 B2 * | 7/2008 | Zimmel | G02B 6/4455 385/135 |
| 7,418,183 B2 | 8/2008 | Wittmeier et al. | |
| 7,744,288 B2 | 6/2010 | Lu et al. | |
| 7,780,173 B2 | 8/2010 | Mullaney et al. | |
| 7,785,016 B2 | 8/2010 | Luther et al. | |
| 8,009,954 B2 | 8/2011 | Bran de Leon et al. | |
| 8,189,983 B2 | 5/2012 | Brunet et al. | |
| 8,385,711 B2 | 2/2013 | Fabrykowski et al. | |
| 8,660,397 B2 | 2/2014 | Giraud et al. | |
| D707,630 S | 6/2014 | Kaplan et al. | |
| 8,861,919 B2 | 10/2014 | Alston et al. | |
| 9,057,858 B2 * | 6/2015 | Alston | G02B 6/4442 |
| 9,864,157 B2 * | 1/2018 | Alston | G02B 6/4442 |
| 2003/0169566 A1 * | 9/2003 | Owens | G02B 6/293 361/688 |
| 2007/0047895 A1 | 3/2007 | Parikh et al. | |
| 2008/0124038 A1 | 5/2008 | Kowalczyk et al. | |
| 2008/0226252 A1 | 9/2008 | Mertesdorf et al. | |
| 2011/0317974 A1 | 12/2011 | Krampotich et al. | |
| 2013/0039623 A1 * | 2/2013 | Zhang | G02B 6/4453 385/73 |

* cited by examiner

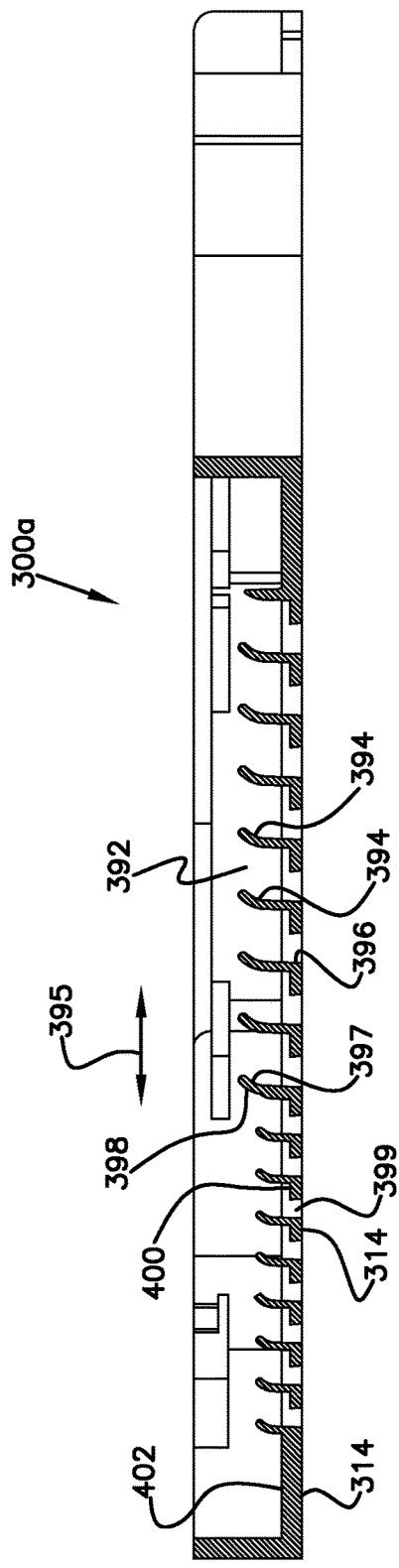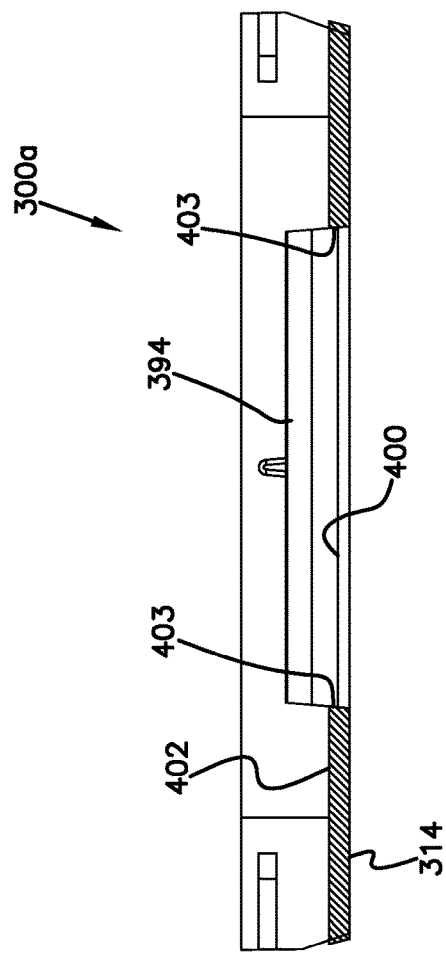
FIG. 13
FIG. 14

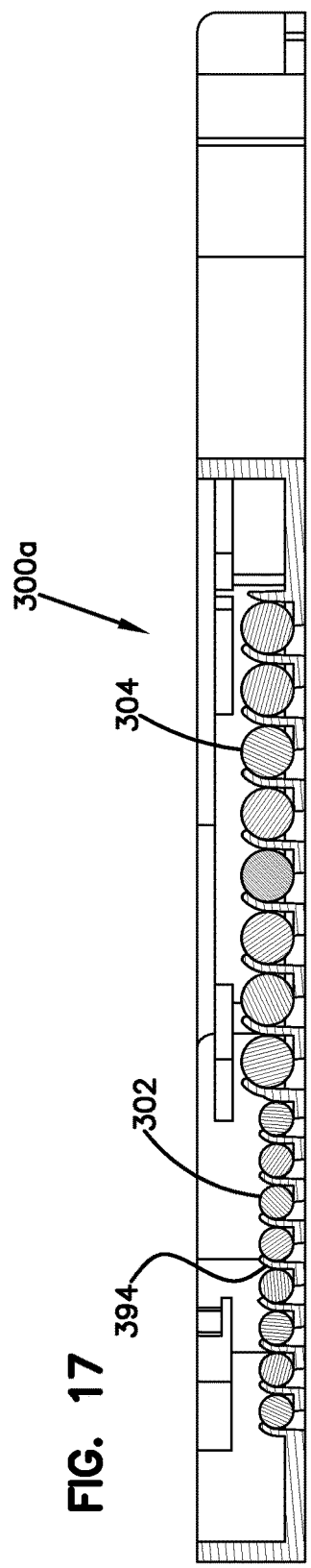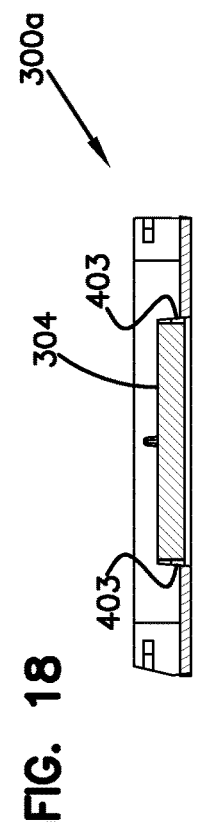
FIG. 17
FIG. 18

FIBER OPTIC CLOSURE

CROSS-REFERENCE TO RELATED APPLICATIONS

This application is a continuation of application Ser. No. 15/582,894, filed May 1, 2017, now U.S. Pat. No. 9,864,157 B2 which is a divisional of application Ser. No. 15/289,459, filed Oct. 10, 2016, now abandoned, which is a continuation of application Ser. No. 14/716,347, filed May 19, 2015, now abandoned, which is a divisional of application Ser. No. 14/495,110, filed Sep. 24, 2014, now U.S. Pat. No. 9,057,858, issued Jun. 16, 2015, which is a divisional of application Ser. No. 13/397,884, filed Feb. 16, 2012, now U.S. Pat. No. 8,861,919, issued Oct. 14, 2014, which application claims the benefit of provisional application Ser. No. 61/468,405, filed Mar. 28, 2011 and provisional application Ser. No. 61/443,501, filed Feb. 16, 2011, which applications are incorporated herein by reference in their entireties.

TECHNICAL FIELD

The present disclosure relates generally to components for fiber optic communications networks. More particularly, the present disclosure relates to sealed closures used in fiber optic networks.

BACKGROUND

Fiber optic communications systems are becoming prevalent in part because service providers want to deliver high band width communication capabilities to customers. Fiber optic communications systems employ a network of fiber optic cables to transmit large volumes of data and voice signals over relatively long distances. A typical fiber optic network includes a system of trunk fiber optic cables each including a relatively large number of optical fibers. Fiber optic networks also include drop cables that interconnect to fibers of the trunk cables at various locations along the lengths of the trunk cables. The drop cables can be routed from the trunk cables to subscriber locations or to intermediate structures such as drop terminals.

Drop cables are often connected to the optical fibers of trunk cables via splices (e.g., fusion splices). Splices are typically supported within splice trays that are often protected from the environment by sealed, re-enterable closures. Such closures typically include sealed ports through which the trunk cables and drop cables enter the closures. Example dome-style splice closures are disclosed in U.S. Pat. Nos. 7,780,173; 5,446,823; and 5,323,480; which patents are hereby incorporated by reference in their entireties.

Drop cables can also be connected to trunk cables through the use of fiber optic connectors (e.g., non-ruggedized connectors or ruggedized connectors). Non-ruggedized connectors are generally less robust that ruggedized connectors. Also, in contrast to non-ruggedized connectors, ruggedized connectors are typically equipped with seals. Because of their non-robust and unsealed structure, non-ruggedized connectors are generally used for inside applications or within sealed closures. In contrast, because of their robust and sealed structure, ruggedized connectors can be used in outside applications where they are exposed to the environment. The use of ruggedized fiber optic connection systems allows pre-connectorized drop cables to be connected to fibers of a trunk cable without accessing the inside of a splice closure. For example, the drop cables can include ruggedized connectors that plug into ruggedized adapters mounted on the outside wall of a splice closure. An example splice enclosure including ruggedized adapters is disclosed in U.S. Pat. No. 7,013,074.

Drop cables can often be routed from a trunk cable to an intermediate structure such as a drop terminal. Drop terminals equipped with ruggedized adapters are disclosed in U.S. Pat. Nos. 7,292,763; 7,120,347; and 7,266,244.

SUMMARY

Certain aspects of the present disclosure relate to devices and methods for upgrading/retrofitting splice closures that have already been installed in the field. For example, the splice closures can be upgraded/retrofitted to include ruggedized fiber optic adapters configured for receiving ruggedized fiber optic connectors mounted at the ends of drop cables.

Another aspect of the present disclosure relates to a dome-style splice closure configured to accommodate the internal splicing of drop cables and also being configured to interconnect with drop cables terminated with ruggedized connectors.

A further aspect of the present disclosure relates to structures and methods for providing closures that have splicing capabilities and are also compatible with pre-connectorized drop cables.

Still another aspect of the present disclosure relates to component trays/cassettes adapted for use in upgrading/retrofitting splice closures.

A variety of additional inventive aspects will be set forth in the description that follows. The inventive aspects can relate to individual features and to combinations of features. It is to be understood that both the foregoing general description and the following detailed description are exemplary and explanatory only and are not restrictive of the broad inventive concepts upon which the embodiments disclosure herein are based.

BRIEF DESCRIPTION OF THE DRAWINGS

FIG. 13 is a cross-sectional view taken along section line 13-13 of FIG. 11;

FIG. 14 is a cross-sectional view taken along section line 14-14 of FIG. 11;

FIG. 17 is a cross-sectional view taken along section line 17-17 of FIG. 15;

FIG. 18 is a cross-sectional view taken along section line 18-18 of FIG. 15;

DETAILED DESCRIPTION

The present disclosure relates generally to closures adapted for use in fiber optic communications networks. In certain embodiments, the closures can be environmentally sealed and can be re-enterable. In certain embodiments, the closures can be configured to provide optical connections in the form of optical splices or connectorized connections.

Figure 1:
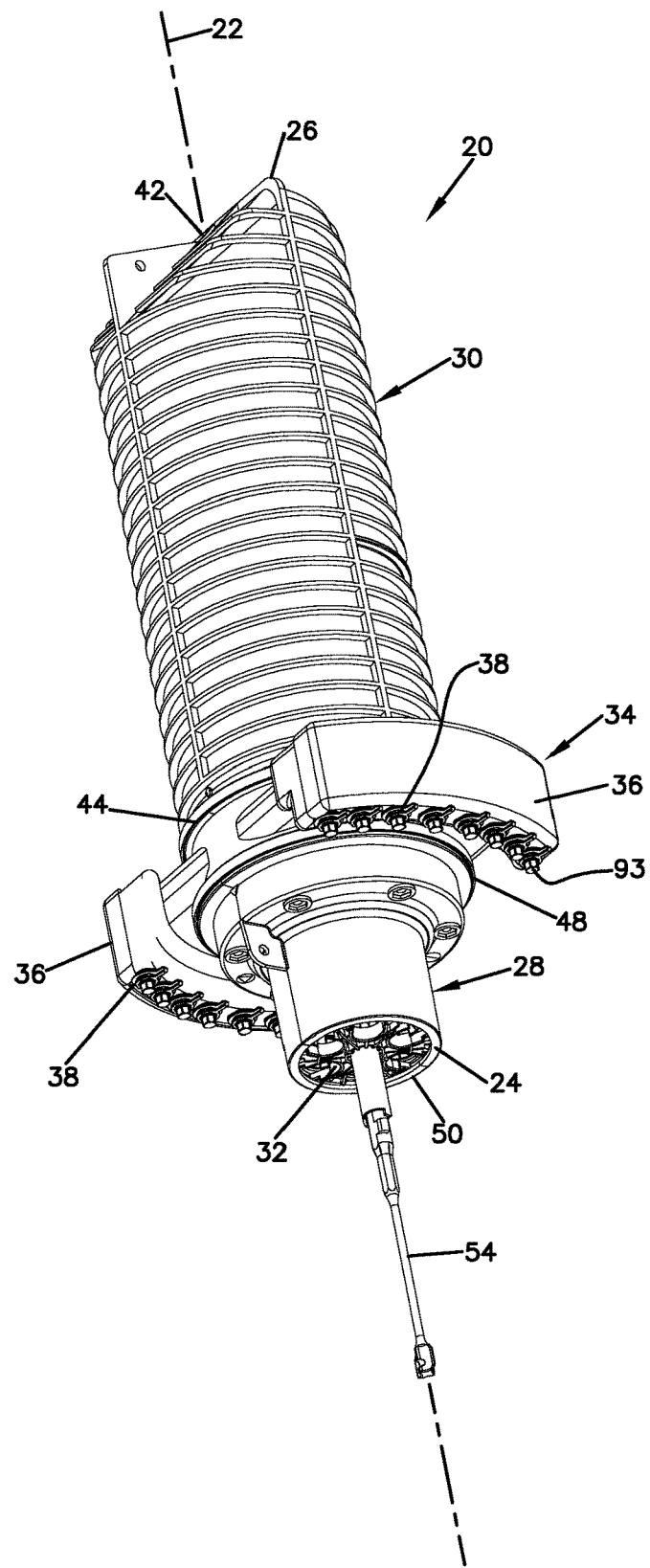
FIG. 1 is a perspective view of a dome-style closure in accordance with the principles of the present disclosure.
Figure 2:
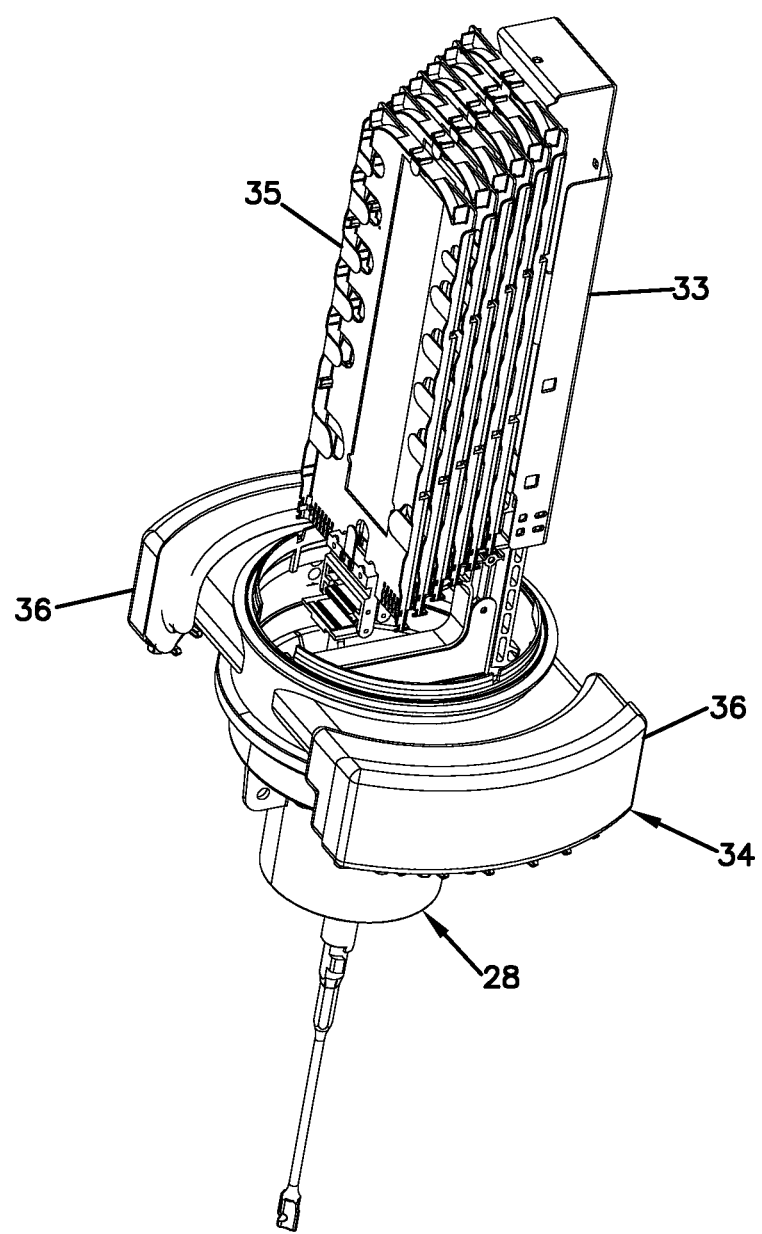
FIG. 2 is a perspective view of the closure of FIG. 1 with the dome removed to expose a stack of splice trays.
Figure 3:
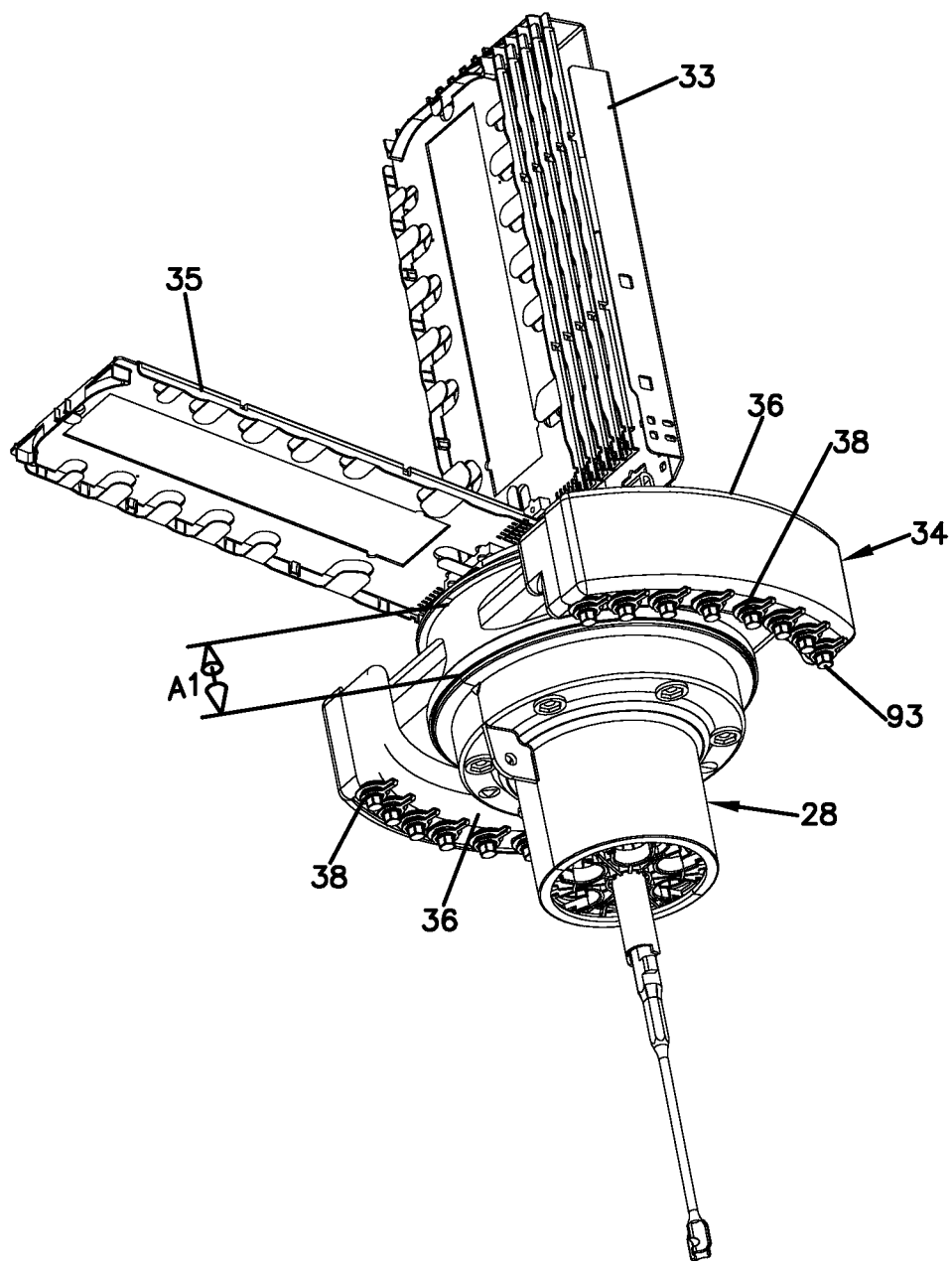
FIG. 3 shows the closure of FIG. 1 with the dome removed and one of the splice trays of the stack of splice trays pivoted downwardly.
Figure 4:
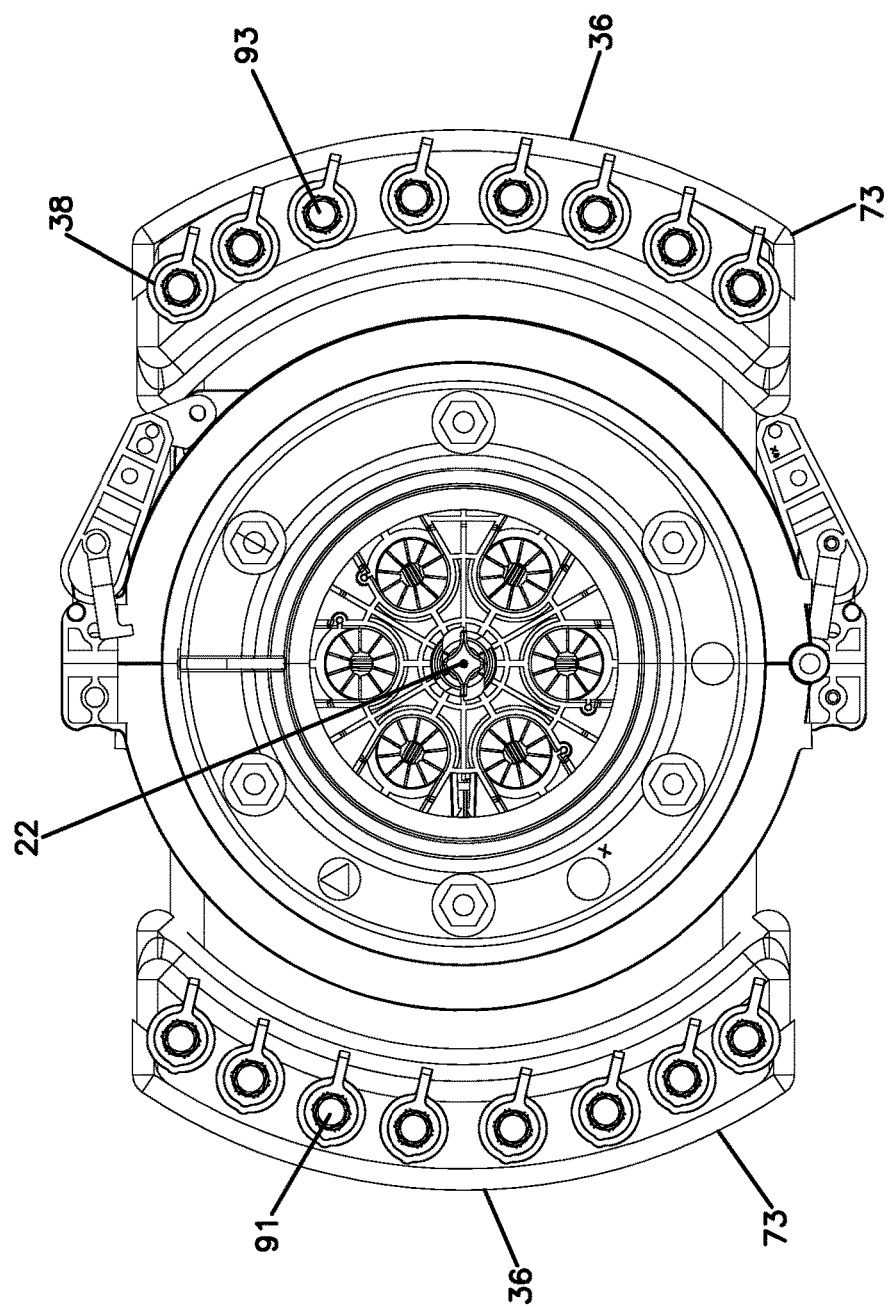
FIG. 4 is a bottom view of the closure of FIG. 1.
Figure 5:
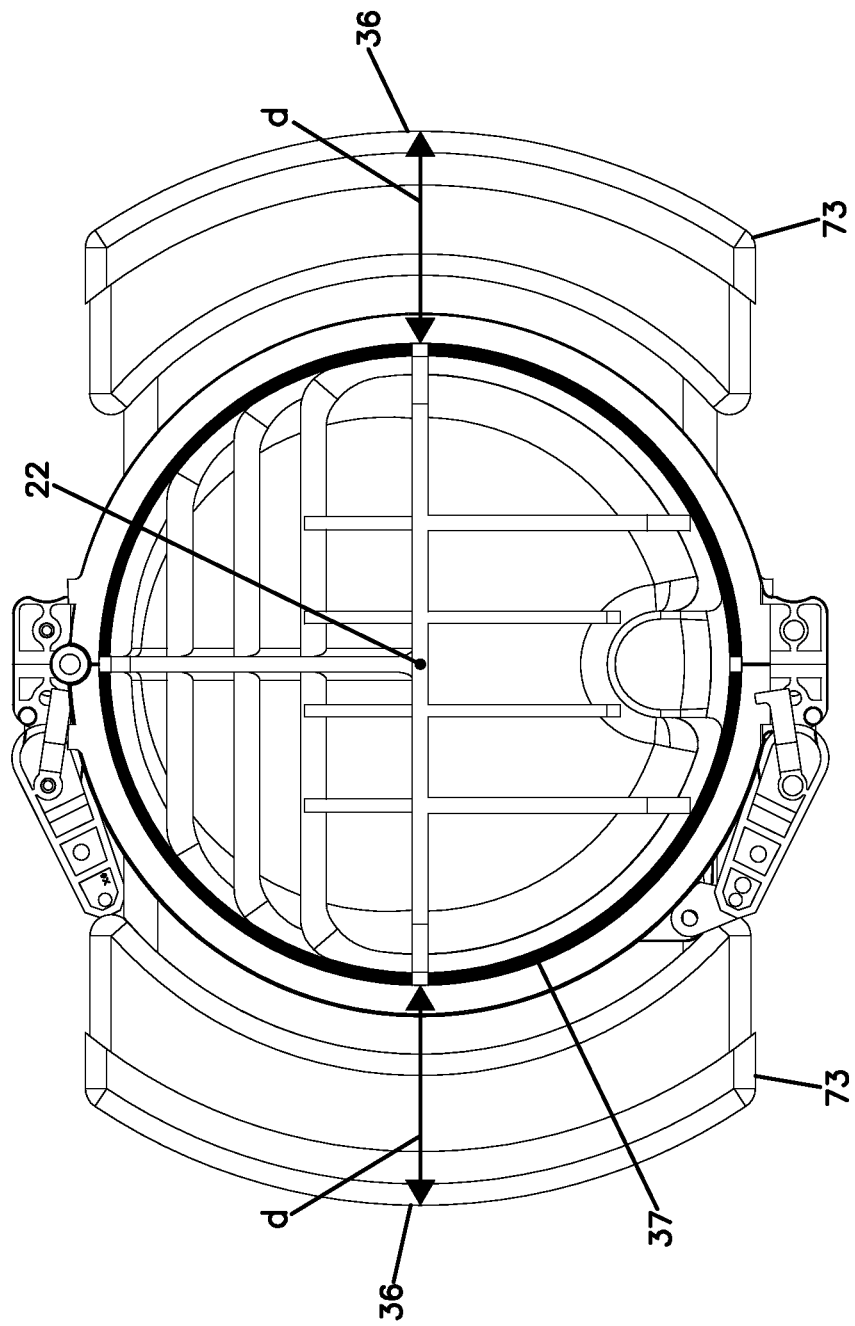
FIG. 5 is a top view of the closure of FIG. 1.

FIGS. 1-6 show a closure 20 in accordance with the principles of the present disclosure. The closure 20 defines a central longitudinal axis 22 that extends along a length of the closure 20 from a bottom end 24 and a top end 26. A base 28 defines the bottom end 24 of the closure 20 while a dome 30 defines the top end 26 of the closure 20. The base 28 defines a plurality of cable through-ports 32 for allowing cables (e.g., trunk cables, drop cables or other cables) to enter the closure 20. The base 28 supports a frame 33 (see FIG. 2) to which a stack of pivotal splice trays 35 are mounted. An expansion component 34 mounts between the dome 30 and the base 28. The frame 33 extends through the expansion component 34. The expansion component 34 includes expansion housings 36 having interior regions adapted to be in communication with the interior of the dome 30 and the interior of the base 28. The expansion housings 36 are positioned on opposite sides of the axis 22 and have dimensions d (see FIG. 5) that project radially outwardly from the axis 22. As shown at FIGS. 4 and 5, expansion housings 36 are positioned radially/laterally outside a main cylindrical outer boundary 37 defined by the dome 30. A plurality of ruggedized fiber optic adapters 38 are mounted to the expansion housings 36. The ruggedized fiber optic adapters 38 include connector ports 84 (see FIG. 9) for receiving ruggedized fiber optic connectors. In the embodiment depicted in FIG. 1, the connector ports 84 and the cable through-ports 32 face in a downward direction and have axes that are generally parallel with respect to the axis 22. In FIGS. 1-5, dust caps 93 are shown mounted in the ports 84.

The dome 30 of the closure 20 includes a closed top end 42 and an open bottom end 44. The closed top end 42 defines the top end 26 of the closure 20 and the open bottom end 44 is configured for a connection to the expansion component 34. In one embodiment, a circumferential flange 46 is provided at the open bottom end 44 for facilitating coupling the dome 30 to the expansion component 34 with a clamp.

The base 28 of the closure 20 includes a top end 48 positioned opposite from a bottom end 50. The bottom end 50 defines the bottom end 24 of the closure 20, and the top end 48 is adapted to be connected to the expansion component 34. In the depicted embodiment, the top end 48 includes a circumferential flange 52 for facilitating coupling the base 28 to the expansion component 34 with a clamp. A cable sealing arrangement is provided within the base 28. The sealing arrangement can be actuated by an actuator 54 which causes sealing material within the base 28 to be compressed in a direction along the axis 22. When the sealing material is axially compressed, the material deforms radially inwardly about the cables within the through-ports 32 thereby forming circumferential seals around cables.

Figure 6:
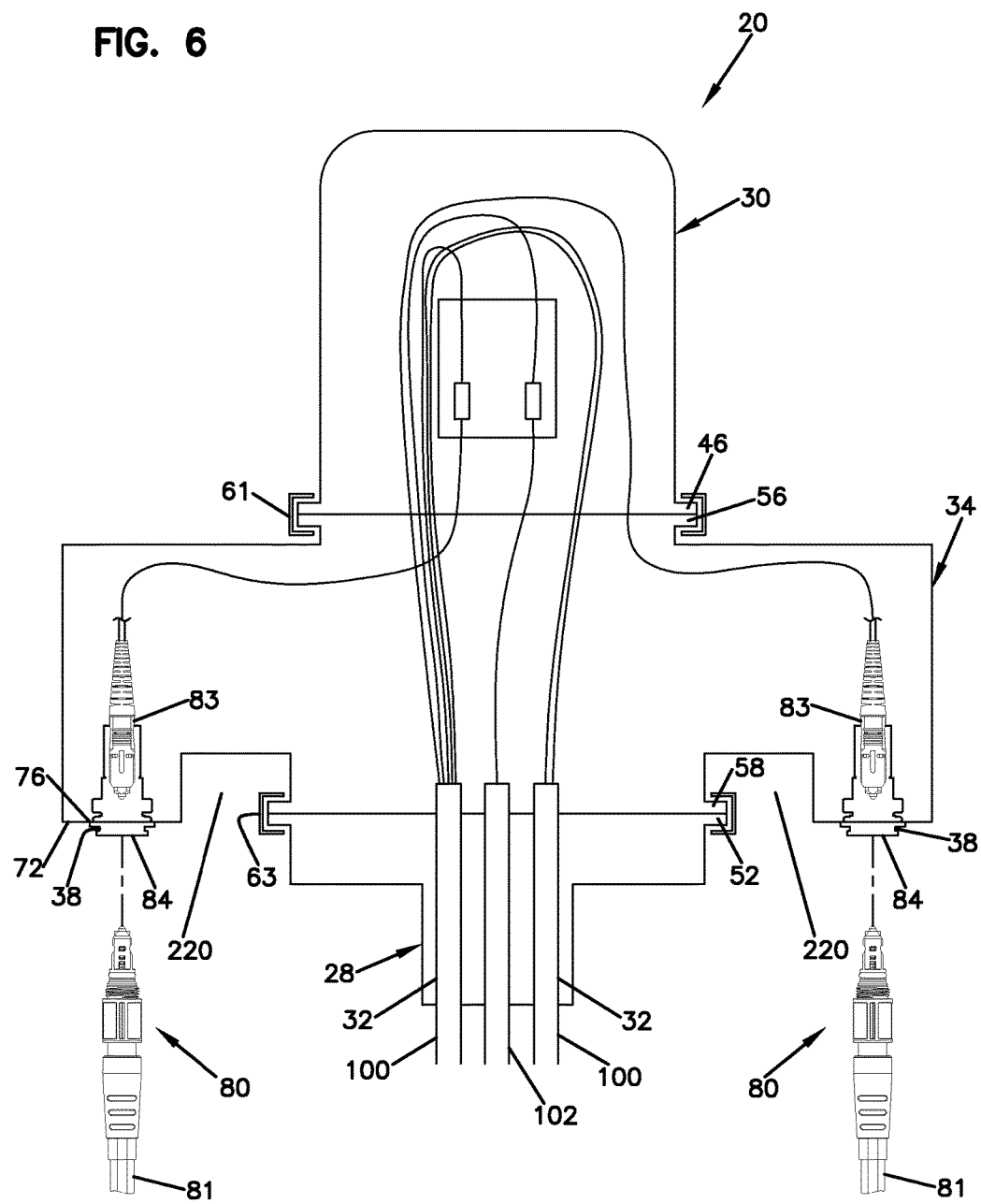
FIG. 6 is a schematic view showing various components of the closure of FIG. 1.
Figure 7:
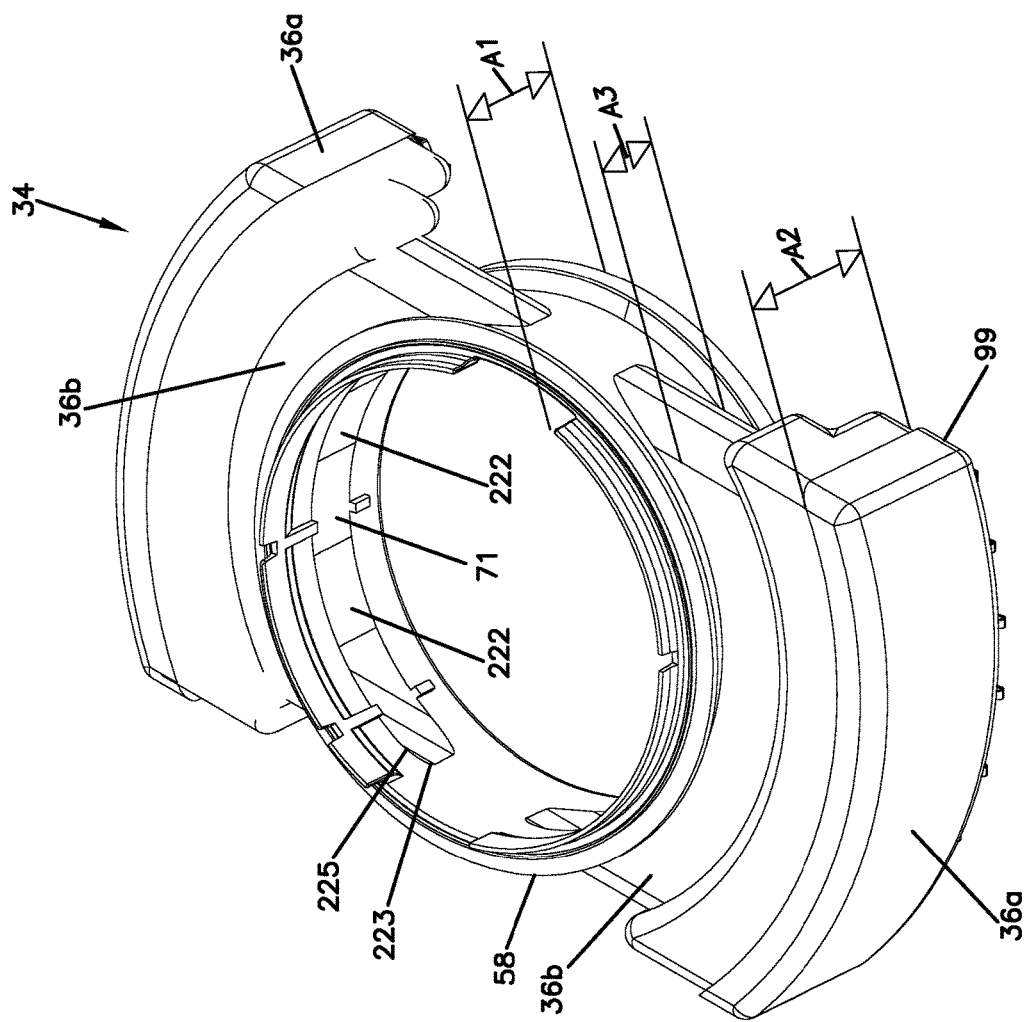
FIG. 7 is a top, perspective view of an expansion component of the closure of FIG. 1.
Figure 8:
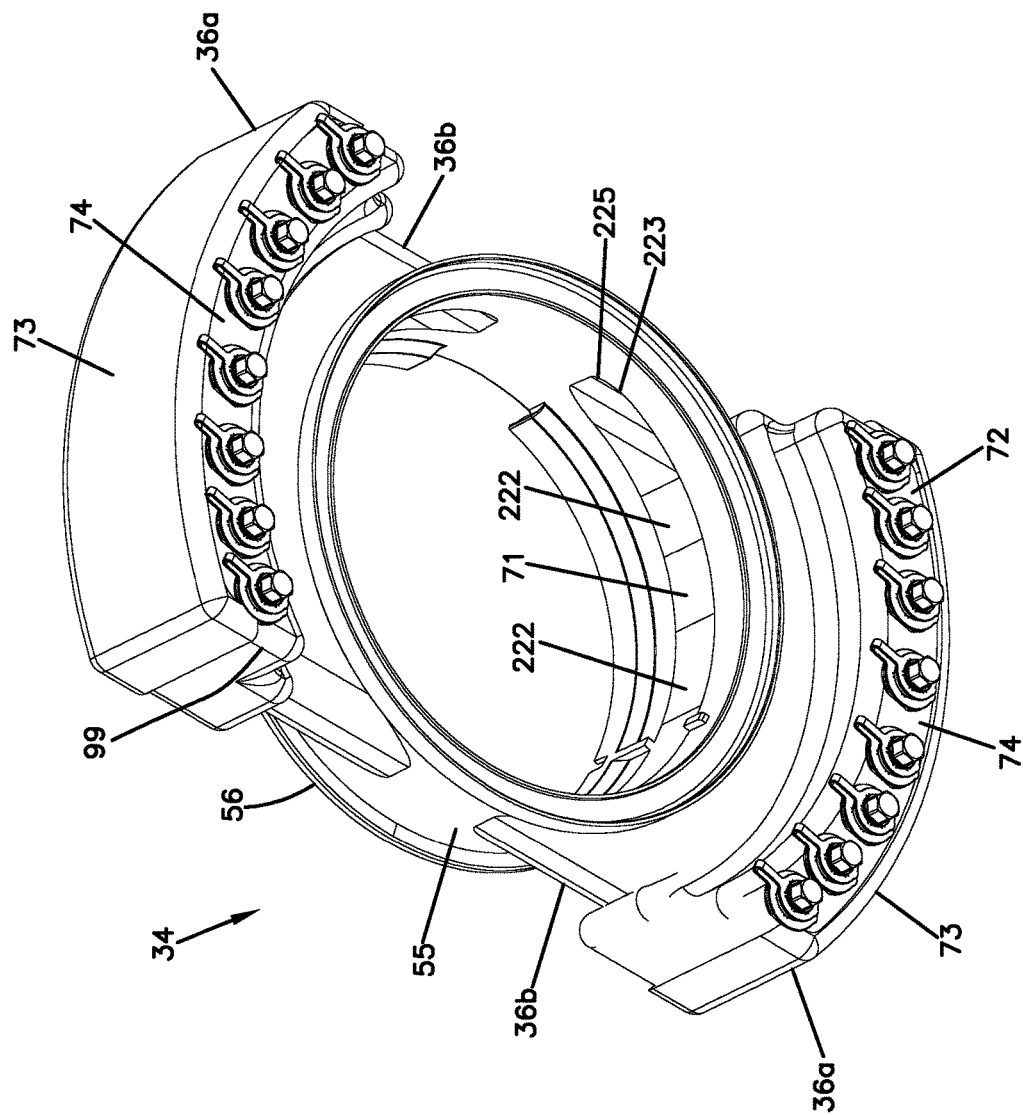
FIG. 8 is a bottom, perspective view of the expansion component of the closure of FIG. 1.

Referring to FIGS. 7 and 8, the expansion component 34 of the closure 20 includes a central collar 55 that mounts between the open bottom end 44 of the dome 30 and the top end 48 of the base 28. The collar 55 can also be referred to as a spacer or a sleeve. An upper end of the collar 55 includes a circumferential flange 56 adapted to be clamped to the circumferential flange 46 at the bottom of the dome 30. A lower end of the collar 55 includes a circumferential flange 58 adapted to be clamped to the circumferential flange 52 at the top end 48 of the base 28. FIG. 6 shows a first channel clamp 61 being used to clamp the flanges 46, 56 together and a second the channel clamp 63 being used to clamp the flanges 52, 58 together. When clamped in place, the collar 55 is generally coaxially aligned with the dome 30 and the base 28.

The central collar 55 includes an axial dimension A1 that is selected to insure that the collar 55 does not interfere with the ability of the splice trays 35 to pivot relative to the frame 33. As shown at FIG. 3, the top end of the collar 55 coincides with a location where the splice trays 35 are pivoted to an open position. In the depicted embodiment, the splice trays 35 are pivoted about 90 degrees relative to the frame 33 when the splice trays are 35 in the open position.

Referring still to FIGS. 7 and 8, the expansion housings 36 of the expansion component 34 include main housings 36a and radial extensions 36b that connect the main housings 36a to the collar 55. The main housings 36a have enlarged internal volumes as compared to the radial extensions 36b. The radial extensions 36b define radial fiber passages 71 that provide communication between interior regions of the main housings 36a and an exterior region of the collar 55. The interior region of the collar 55 is also in communication with an interior region of the dome 30 and an interior region of the base 28. Reinforcing wall portions 222 (e.g., webs) can extend across heights of the fiber passages 71. The wall portions 222 are located at the ends of the passages 74 that are positioned adjacent the collar 55. The wall portions 222 have curvatures that extend about the central axis 22 and also have heights that extend along the axial dimension A1. The wall portions 222 provide crush resistance in the axial orientation. The radial extensions 36b can also include tray guide rails 223 provided at side walls 225 of the radial extensions 36b.

The main housings 36a of the expansion component 34 are shaped to curve generally about the axis 22 of the closure 20. Bottom sides of the main housings 36a are defined by adapter mounting walls 72 having outer surfaces 74 that face in a downward direction. Adapter mounting openings 76 extend through the adapter mounting walls 72. The ruggedized fiber optic adapters 38 are mounted within the adapter mounting openings 76. The adapter mounting openings 76 of each of the main housings 36a are positioned along a curve located radially outside the main cylindrical boundary 37 defined by the dome 30. The fiber optic adapters 38 are axially offset (e.g., upwardly offset) from the through-ports 32 of the base 28 and are also radially outwardly offset from the through-ports 32 of the base 28.

Figure 9:
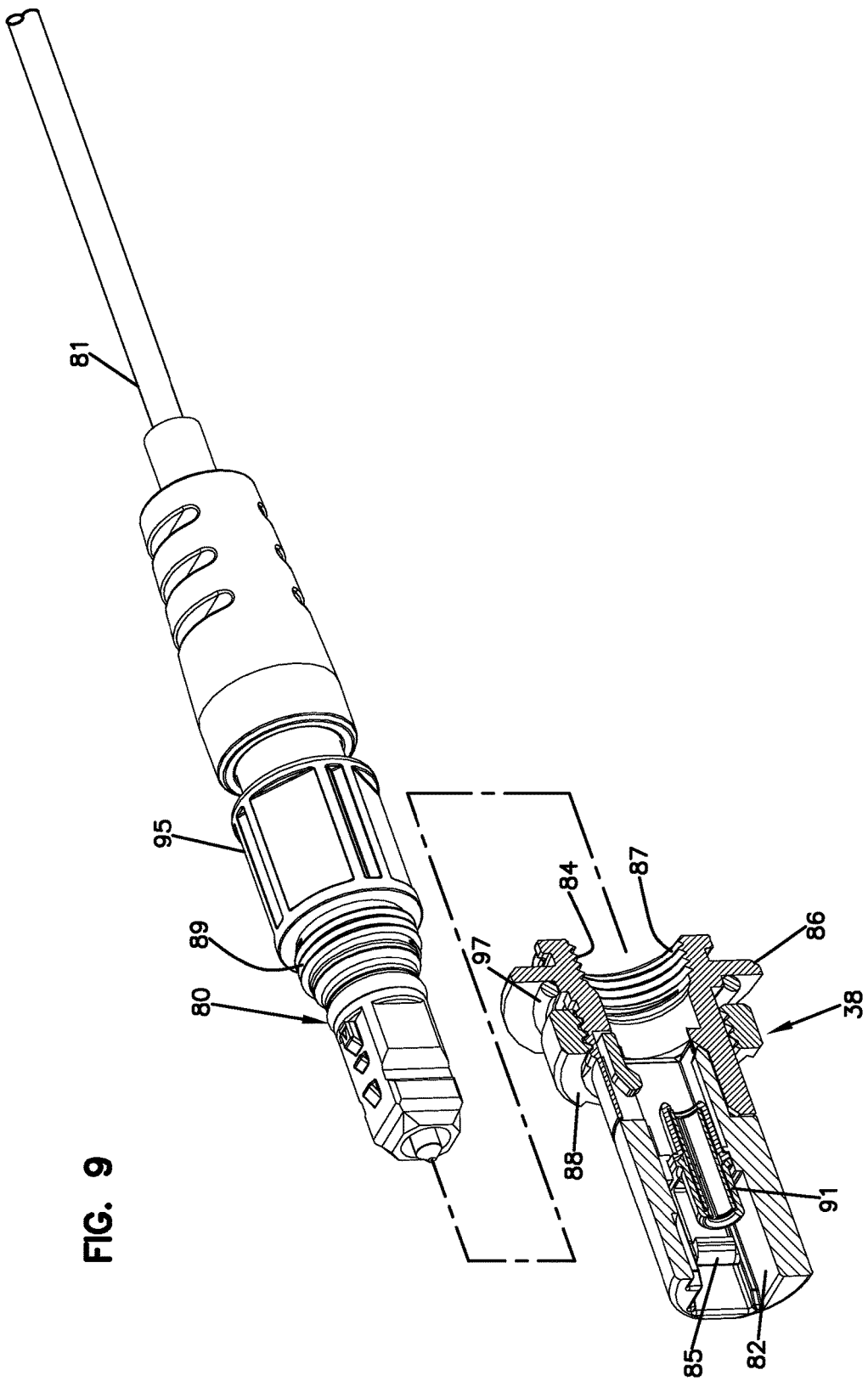
FIG. 9 shows a ruggedized adapter and ruggedized connector suitable for use with the closure of FIG. 1.

FIG. 9 shows one of the ruggedized fiber optic adapters 38 and a corresponding ruggedized fiber optic connector 80 adapted to be received within the fiber optic adapter 38. The fiber optic connector 80 is shown mounted at the end of a drop cable 81. The fiber optic adapter 38 includes an inner port 82 adapted for receiving a connector such as an SC connector 83 (see FIG. 6), and an outer port 84 adapted for receiving one of the ruggedized fiber optic connectors 80. When the fiber optic connector 80 and the fiber optic connector 83 are inserted within one of the fiber optic adapters 38, an optical connection is provided between the connectors 80, 83. The fiber optic adapter 38 can include a latch 85 for retaining the fiber optic connector 83 within the inner port 82. Internal threads 87 can be provided in the outer port 84. The threads 87 cooperate with external threads 89 of a threaded nut 95 provided on the ruggedized fiber optic connector 80 to retain the ruggedized fiber optic connector 80 within the outer port 84. An alignment sleeve 91 is provided within the fiber optic adapter 38 for aligning ferrules of the connectors 80, 83.

When the fiber optic adapter 38 is mounted within one of the adapter mounting openings 76 of the expansion component 34, the adapter mounting wall 72 is captured between a flange 86 of the adapter 38 and a retention nut 88. A sealing member 97 in the form of an o-ring can be used to provide a seal between the housing of the fiber optic adapter 38 and the outer surface 74 of the adapter mounting wall 72.

The main housings 36a have axial dimensions A2 that are larger than corresponding axial dimensions A3 of the radial extensions 36b. The axial dimensions A2 are larger than the axial dimensions A3 at least in part because of axial extension portions 99 that project downwardly from the radial extensions 36b. The axial extension portions 99 function to downwardly offset the adapter mounting walls 72 from the radial extensions 36b. The enlarged axial dimensions A2 provide more axial space within the main housings 36a (i.e., between the upper and lower walls of the main housings 36a) for routing fibers. For example, sufficient space is provided for bending optical fibers corresponding to the connectors 83 without violating minimum bend radius requirements for the optical fibers. As shown at FIG. 6, the optical fibers coupled to the connectors 83 are bent about 90 degrees as the optical fibers are routed from the connectors 83 within the fiber optic adapters 38 to the fiber passages 71 of the radial extensions 36b. Furthermore, as shown at FIG. 6, a gap/open space 220 defined radially between the axial extension portions 99 and the central collar 55 provides clearance for mounting and accessing the clamp 63.

The closure 20 is adapted to accommodate both splice connections and connectorized connections (e.g., connections using ruggedized connectors). For example, FIG. 6 shows a trunk cable 100 routed through the interior of the closure 20. The trunk cable 100 extends through the through-ports 32 provided at the base 28. As shown at FIG. 6, one or more of the fibers of the trunk cable 100 can be spliced to corresponding fibers of a drop cable 102 that is also routed through a cable through-port 32 of the base 28. In this way, the closure 20 accommodates a spliced connection with a drop cable. To accommodate a pre-connectorized drop cable, the pre-connectorized drop cable can be plugged into the outer port 84 of one of the fiber optic adapters 38. When the connector of the pre-connectorized drop cable is inserted within the outer port 84, it optically connects to a corresponding connector 83 that has been pre-mounted within the inner port of the adapter 38. The connector 83 can be mounted directly to one of the optical fibers of the trunk cable 100. For example, the connector 83 can be field terminated on the fiber. Alternatively, the connector 83 can be mounted at the end of a pigtail fiber that is spliced to a corresponding one of the fibers of the trunk cable 100 at the splice location.

The main housings 36a can include outer end covers 73 that are removable from main bodies of the main housings 36a. By removing the end covers 73, interior regions of the main housings 36a can be easily accessed for loading trays into the radial extensions 36b, for routing connectors 83 to the inner ports of the adapters 38, or for service operations or maintenance activities.

The configuration of the expansion component 34 is ideally suited for use in retrofitting/upgrading existing splice closures that are already in operation in the field. To upgrade such a closure, the dome 30 of the closure can be removed and the expansion component 34 can be mounted to the base of the closure. The connectors 83 mounted within the inner ports 82 of the fiber optic adapters 38 can then be optically connected to optical fibers of one or more trunk/feeder cables routed into and/or through the closure. For example, the connectors 83 can be field terminated at ends of selected fibers of the trunk cables. Alternatively, the connectors 83 can be mounted at the end of pigtails which are spliced to fibers of the trunk cables. Once the connectors 83 mounted within the inner ports of the adapters 38 are connected to selected fibers of the trunk cable, the dome 30 of the splice closure can then be clamped to the top end of the collar 55 and the upgrade is complete.

Further details relating to the fiber optic adapter 38 and the ruggedized fiber optic connector 80 can be found in U.S. Pat. No. 7,744,288, which is hereby incorporated by reference in its entirety. In other embodiments, other types or styles of fiber optic adapters/connectors can be used at the expansion component 34. For example, other fiber optic adapters and fiber optic connectors that can be used at the expansion component 34 are disclosed at U.S. Pat. Nos. 6,579,014; 6,899,467; and 7,090,406. The above connectors systems all relate to the connection of single fibers. In still further embodiments, multi-fiber connection systems can be used at the expansion component. Example multi-fiber connectors and adapters are disclosed at U.S. Pat. Nos. 7,785,016 and 7,264,402; which are hereby incorporated by reference in their entireties.

For the purpose of providing a closure design suitable for retrofitting existing splice closures, it is desirable for the expansion component 34 to be a separate piece from the dome 30 and the base 28. However, in alternative embodiments, the expansion component 34 can be integrally formed with either the dome 30 or the base 28.

In certain embodiments, the expansion component 34 can include additional structures for increasing the service capacity of the closure. Example structures can include passive components such as optical power splitters and structures for providing optical wavelength splitter/dividing/filtering. Optical power splitters are capable of splitting an entire optical signal carried by one optical fiber to two or more optical fibers (e.g., 1 by 2 splitters; 1 by 4 splitters; 1 by 8 splitters, 1 by 16 splitters; 1 by 32 splitters, etc.), and are also capable of combining optical signals from multiple fibers back to one optical fiber. Wavelength splitting/dividing structures (e.g., coarse wavelength dividing multiplexers and de-multiplexers, dense wavelength dividing multiplexers and de-multiplexers, array waveguide grading structures, etc.) are capable of dividing an optical signal carried by one optical fiber into separate wavelength ranges with each range then being directed to and carried by a separate optical fiber, and are also capable of combining separate wavelength ranges carried by separate optical fibers back to one optical fiber.

Figure 10:
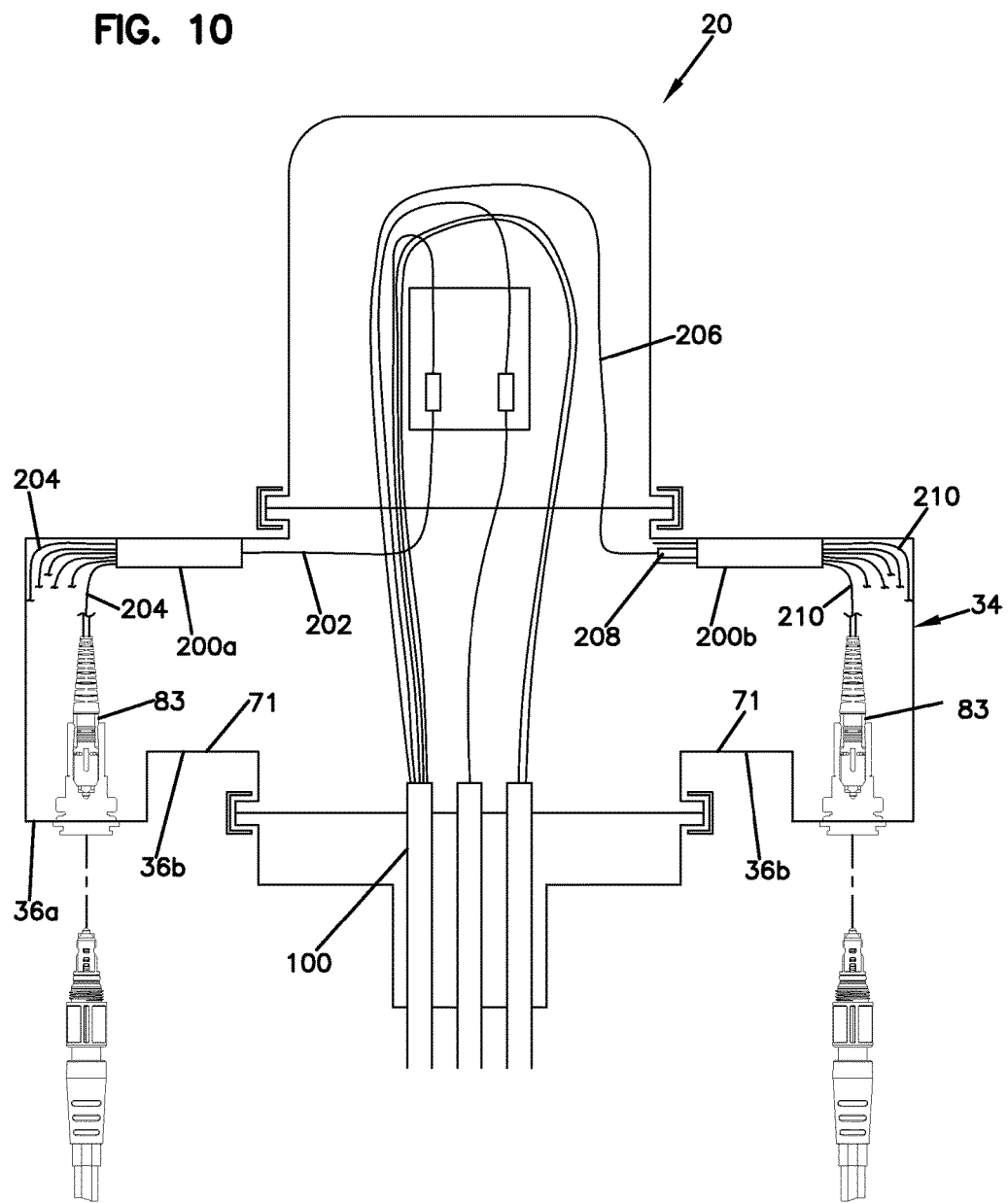
FIG. 10 shows the closure of FIG. 1 equipped with components (e.g., optical power splitters, optical wavelength dividing components, etc.) for increasing the service capacity of the closure.

FIG. 10 shows the expansion component 34 equipped with service capacity increasing components 200a, 200b of the type described in the previous paragraph (e.g., optical power splitters, optical wavelength splitters, etc.). The components 200a, 200b are shown mounted in the passages 71 defined by the radial extensions 36b. An input fiber 202 to the component 200a is shown spliced to a corresponding optical fiber of the trunk cable 100 and output fibers 204 of the component 200a are coupled to the fiber optic connectors 83 inserted within the inner ports of the fiber optic adapters 38. An input fiber 206 of the component 200b is provided by one of the optical fibers of the trunk cable 100. The input fiber 206 has a connectorized end 208 that connects to the component 200b in a plug-and-play type configuration. Further details about example plug-and-play type connections for optical splitters are disclosed at U.S. Pat. Nos. 7,376,322; 7,400,813; 7,376,323; and 7,346,254; which are hereby incorporated by reference in their entireties. Output fibers 210 of the component 200b are coupled to the fiber optic connectors 83 inserted within the inner ports of the fiber optic adapters 38.

FIGS. 11-18 show a component tray 300a (i.e., cassette) adapted to be mounted within the passage 71 of one of the radial extensions 36b. The component tray 300a is configured to securely retain optical components such as splice sleeves 302 and wavelength splitting components 304. The splice sleeves are structures for reinforcing a slice (e.g., a fusion splice) between two optical fibers. A splice sleeve typically includes an inner adhesive layer surrounded by a heat shrink layer. Splice sleeves also typically include axial reinforcing members attached to the heat shrink layer. As shown at FIGS. 15-18, the splice sleeves 302 and the components 304 are generally cylindrical. The components 304 have larger diameters as compared to the splice sleeves 302.

Figure 19:
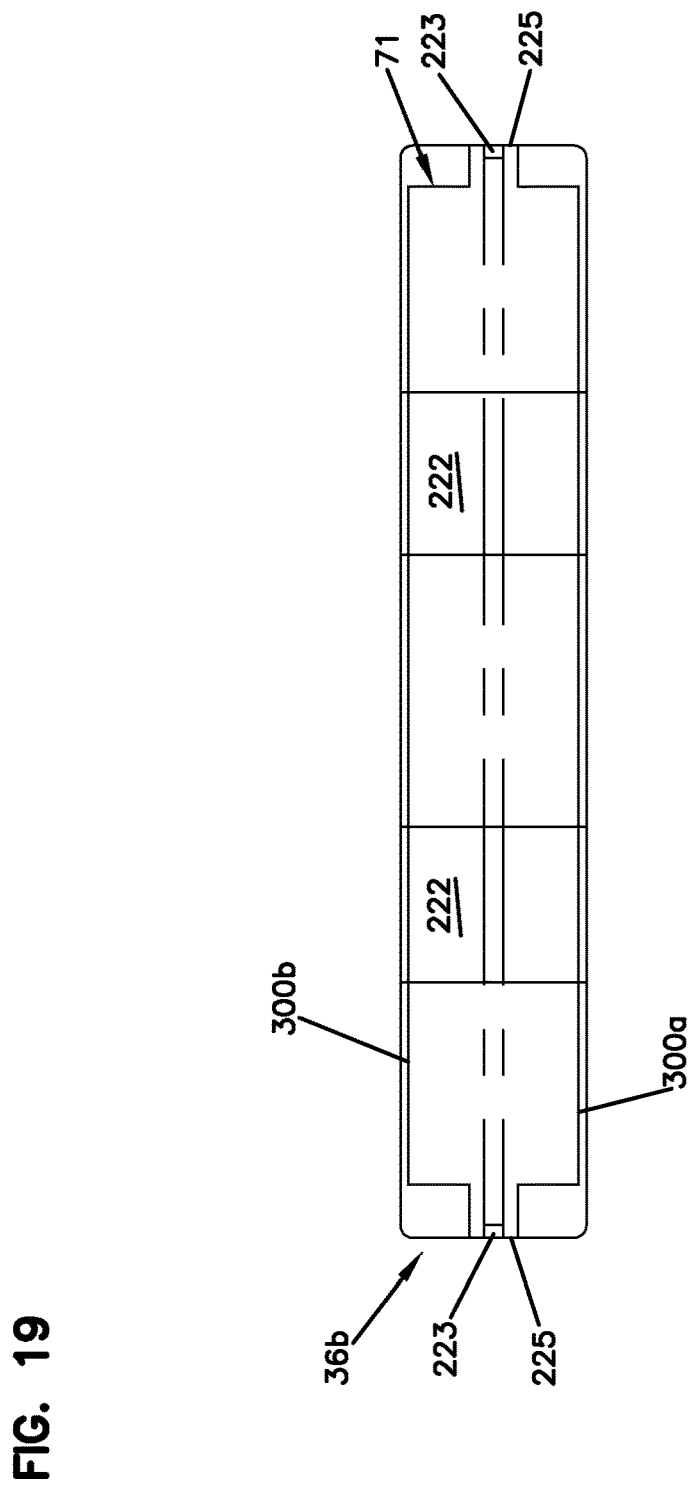
FIG. 19 shows an inner passage of a radial extension of the closure of FIG. 1, component trays are shown mounted within the inner passage.

The first component tray 300a is sized and shaped to fit within one of the radial extensions 36b without projecting substantially into the collar 55 or the main housings 36a. As shown at FIG. 19, the component tray 300a is mounted at a lower mounting location of one of the radial extensions 36b, and another component tray 300b (see FIGS. 24-31) is mounted at an upper mounting location of the radial extension 36b. In certain embodiments, each of the radial extensions 36b can be loaded with component trays 300a, 300b so as to maximize the circuit density provided by the expansion component 34.

Figure 11:
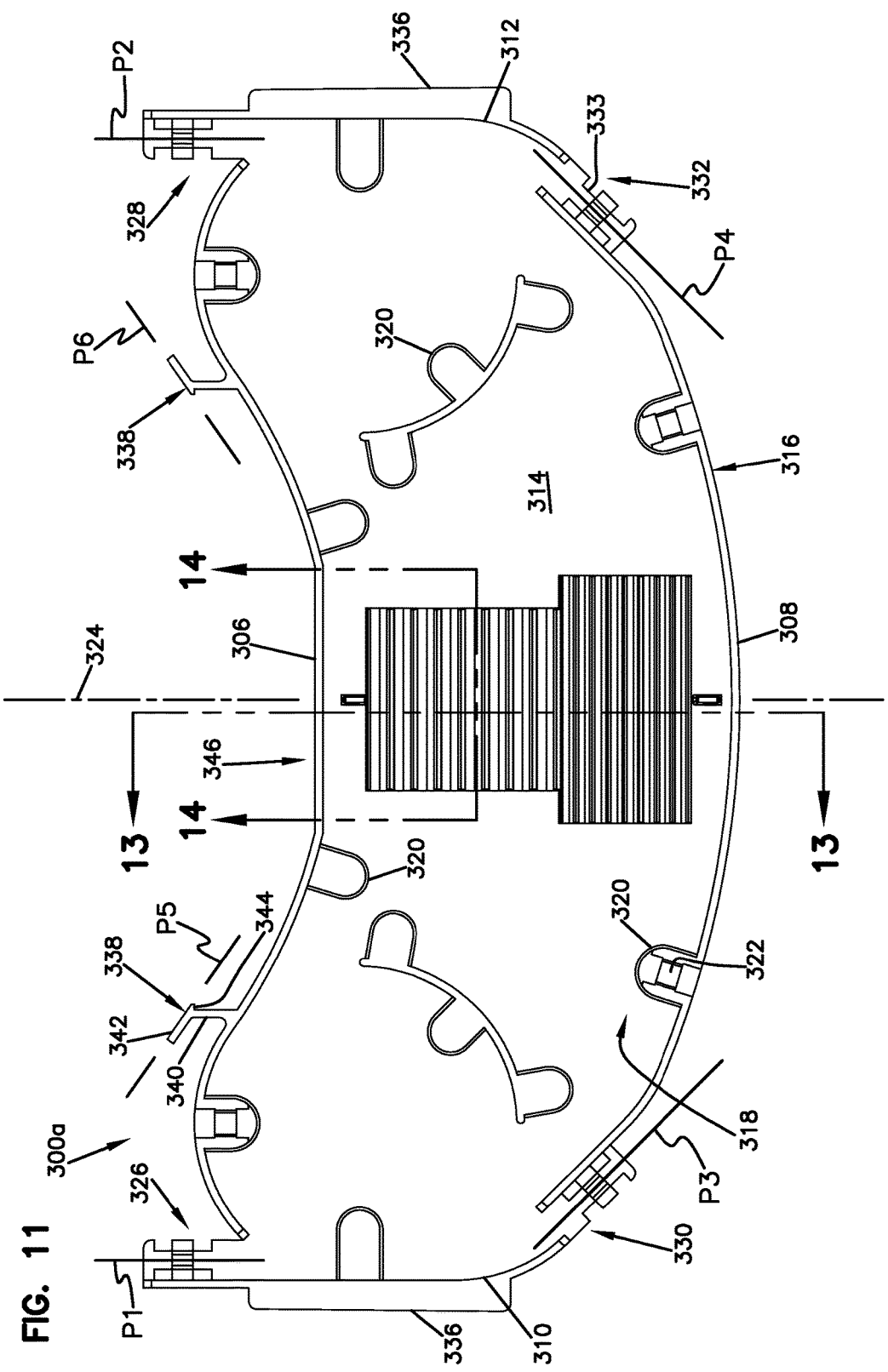
FIG. 11 is a plan view of a first component tray adapted for use with the closure of FIG. 1.
Figure 12:
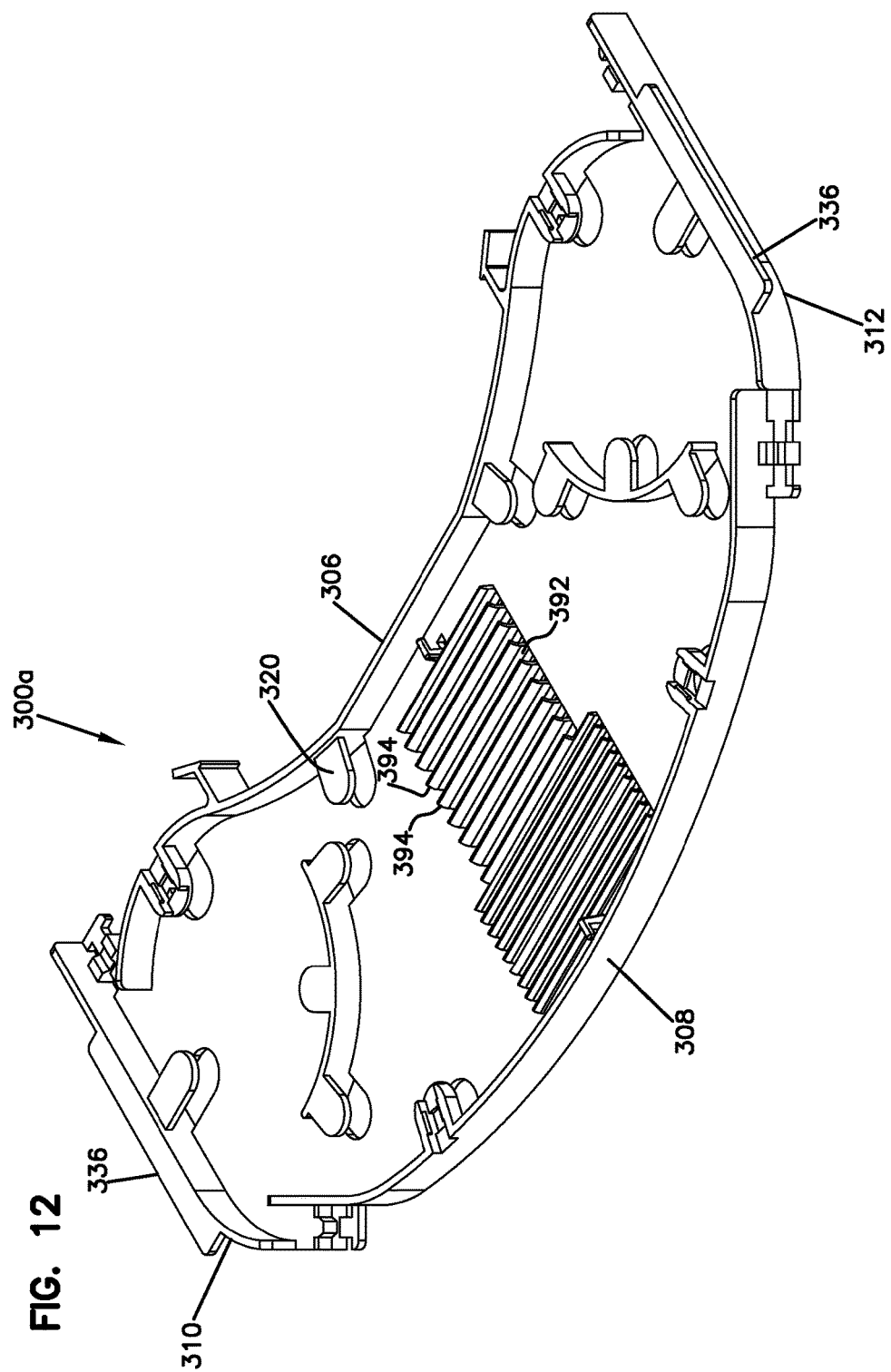
FIG. 12 is a perspective view of the component tray of FIG. 11.
Figure 15:
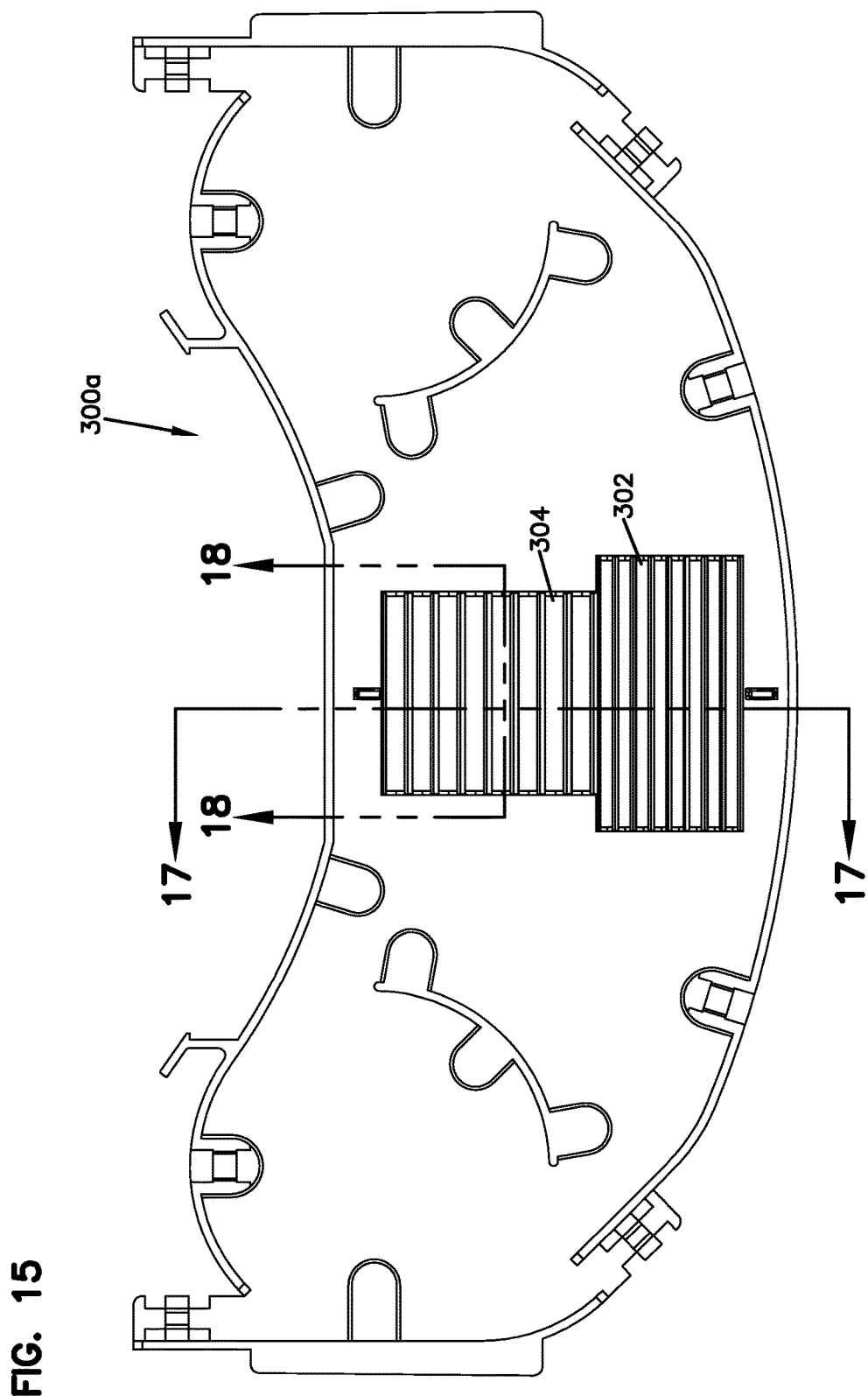
FIG. 15 is a plan view of the component tray of FIG. 11 with wavelength splitting components and splicing components secured thereto.
Figure 16:
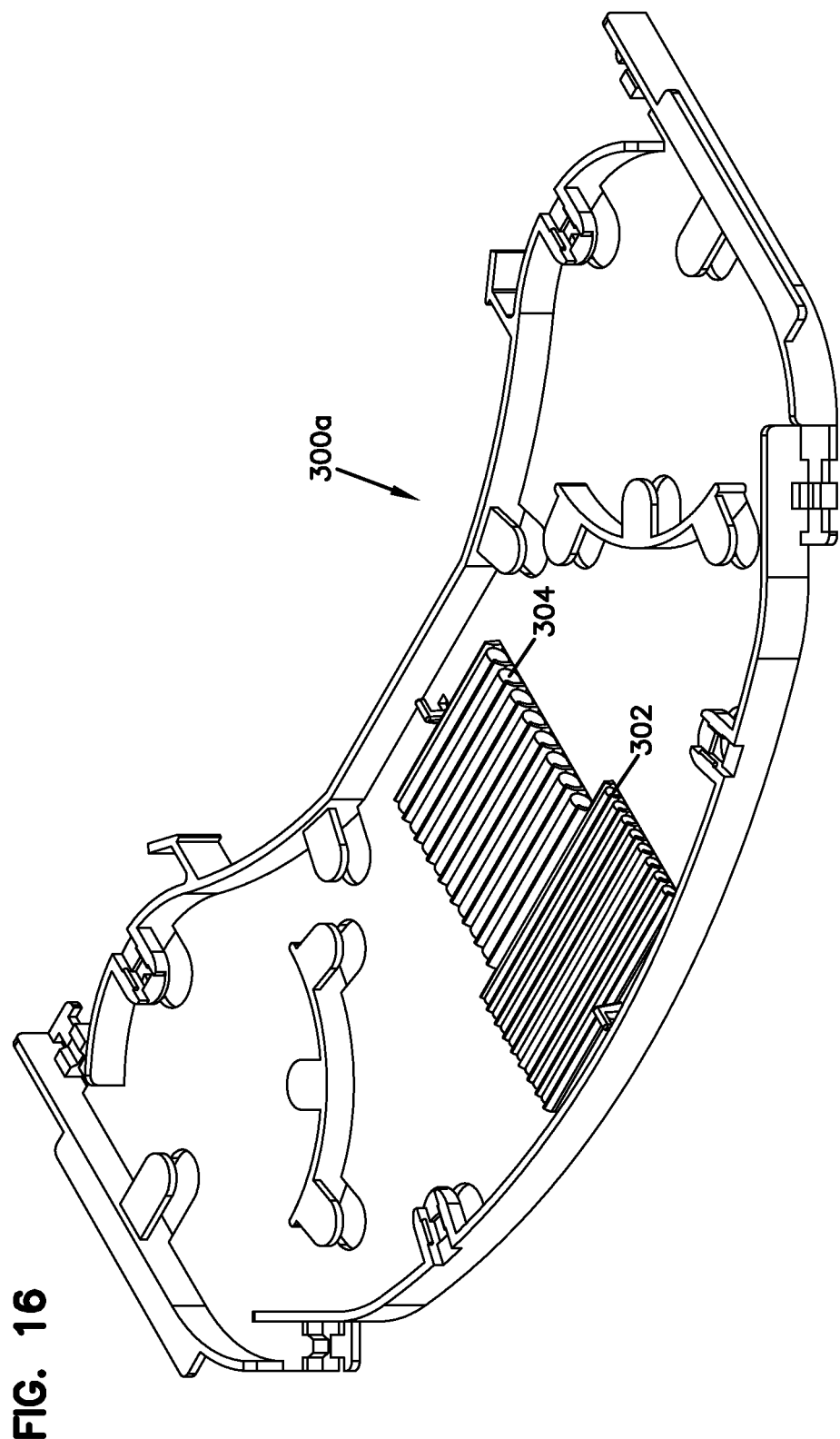
FIG. 16 is a perspective view of the component tray of FIG. 11 with wavelength splitting components and splicing components secured thereto.

Referring to FIG. 11, the component tray 300a has a generally kidney-shaped perimeter when viewed in plan view. The perimeter is defined in part by a concave side 306 of the tray 300a and an opposite convex outer side 308 of the tray 300a. The perimeter is also defined by opposite ends 310, 312 of the tray 300a that extend between the concave and convex sides 306, 308. The ends 310, 312 are substantially parallel to one another. The tray 300a includes a base 314 and a perimeter wall arrangement 316 that projects upwardly from the base 314. The perimeter wall arrangement 316 extends around the perimeter of the tray 300a and cooperates with the base 314 to define a protected fiber management volume/space 318 above the base 314. Fiber retention tabs 320 project inwardly from the perimeter wall arrangement 316. The tabs 320 are spaced above the base 314 and overhang the fiber management space 318. The tabs 320 function to retain optical fibers routed on the tray 300a within the fiber management space 318. Some of the tabs 320 include receptacles 322 for receiving fasteners (e.g., snap-fit fasteners) used to secure a cover over the top of the space 318.

Referring still to FIG. 11, the tray 300a is symmetric about a central axis 324. The tray 300a includes two fiber entrance/exit locations 326, 328 positioned at the concave side 306 of the tray and two fiber entrance/exit locations 330, 332 positioned at the convex side 308 of the tray. The locations 326, 330 are at one end 310 of the tray and the locations 328, 332 are located at the other end 312 of the tray. The locations 326, 328 define fiber routing paths P1, P2 that are substantially parallel to the central axis 324, while the locations 330, 332 define fiber routing paths P3, P4 that converge toward and intersect at the central axis 324. Tie down structures 333 are provided at each of the exit/entrance locations for allowing tubing protecting the optical fibers to be tied down (e.g., with cable ties) to the tray.

The tray 300a includes structures for facilitating securing the tray within the bottom mounting location of one of the radial extensions 36b. For example, the tray 300a includes flanges 336 that project outwardly from the opposite ends 310, 312 at locations adjacent the top of the tray 300a. When the tray 300a is mounted within one of the radial extensions 36b, the flanges 336 slide beneath the side rails 223 of the extension 36b. The tray 300a also includes resilient retention latches 338 positioned at the concave side 306 of the tray 300a. The latches 338 are positioned between the central axis 324 and the fiber entrance/exit locations 326, 328 and are adapted to latch (e.g., by a snap fit connection) over the edges the walls 222 of the radial extension 36b when the tray 300a is fully inserted therein. The latches 338 include a flexible cantilever portion 340, a cam portion 342 and a catch 344. The cantilever portion 340 is substantially parallel to the central axis 324 and the cam portions 342 define cam surfaces aligned along planes P5, P6 that are angled relative to the central axis 324. The planes P5, P6 converge as the planes extend toward the concave side 306 of the tray 300a. The concave shape of the tray provides a recess 346 between the latches 338. The recess 346 provides clearance for the walls 222 when the tray 300a is latched within one of the radial extensions 36b.

To load the tray 300a into the radial extension 36b, the cover 73 is removed from the corresponding main housing 36a. The tray 300a is then inserted though the open side of the main housing 36a in a radial direction directed toward the central axis 22 of the expansion component 34. The insertion direction is parallel to the central axis 324 of the tray 300a. As the tray 300a is inserted into the radial extension 36b, the flanges 336 ride beneath the rails 223 in close proximity to the side walls 225. Continued insertion of the tray 300a toward the axis 22 brings the cam surfaces of the cam portions 342 into contact with the walls 222. Contact between the cam portions 342 and the walls 222 causes the cantilever portions 340 to flex such that the latches 338 flex away from each other (i.e., apart) to provide clearance for the walls 222. Once the catches 344 move past the edges of the walls 222, the latches 338 snap (i.e., elastically return) to a retention position (see FIG. 20) where the catches engage inner sides of the walls 222 so as to retain the tray 300a within the extension 36b.

Figure 20:
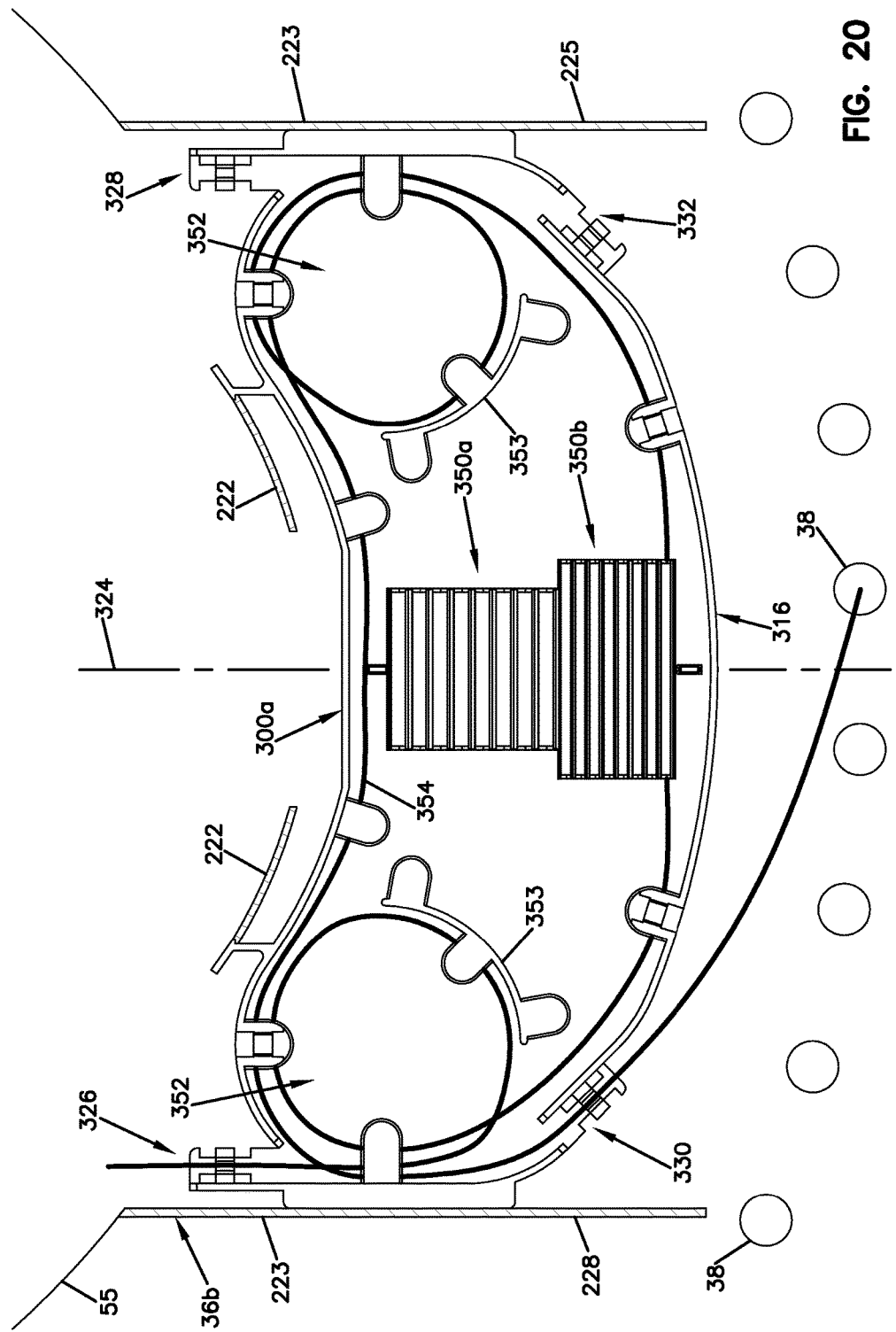
FIG. 20 is a diagrammatic cross-sectional view showing the component tray of FIG. 11 mounted in one of the radial extensions of the closure of FIG. 1, a first fiber routing path of the component tray is also shown.
Figure 21:
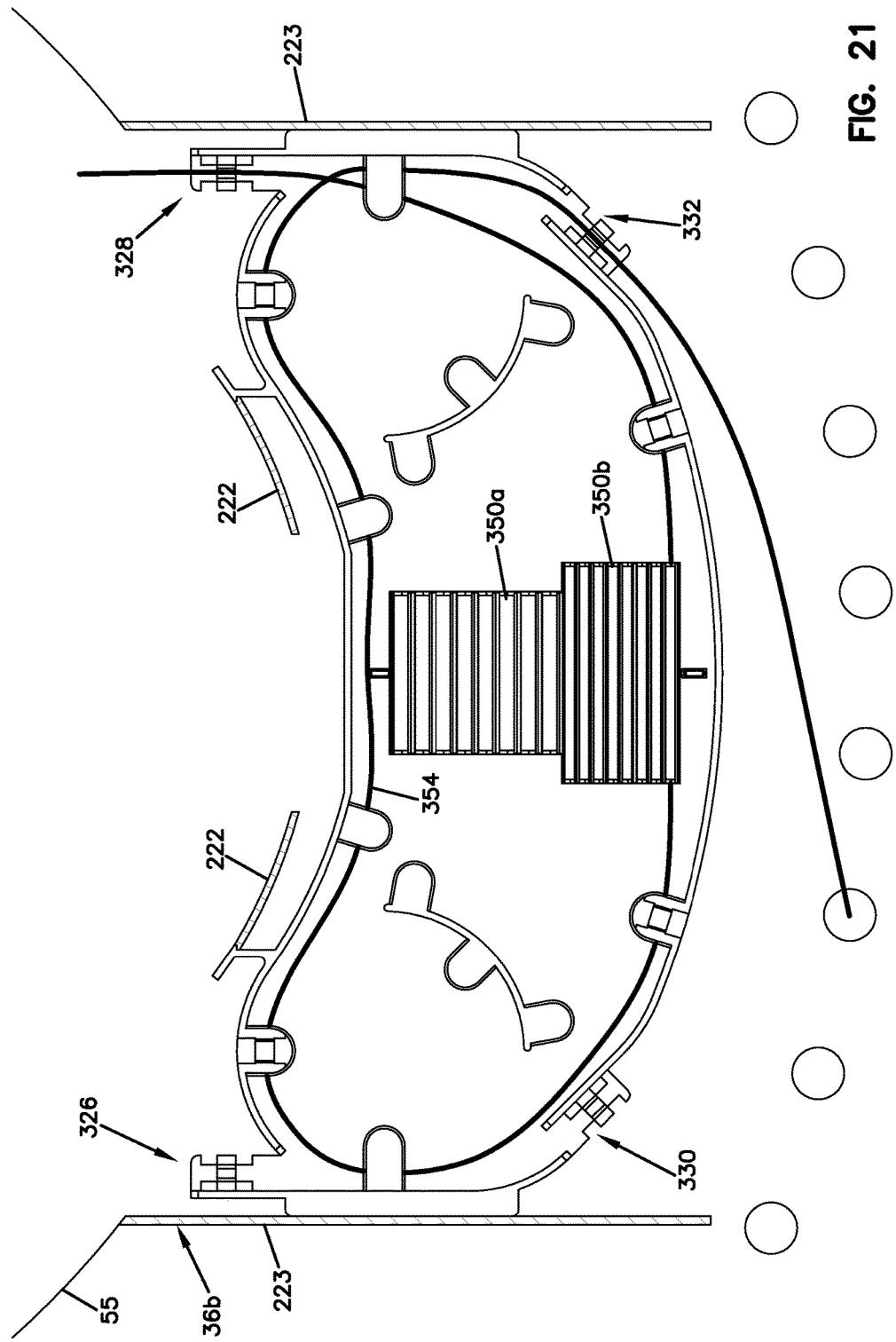
FIG. 21 is the same view as FIG. 20 showing a second fiber routing path.
Figure 22:
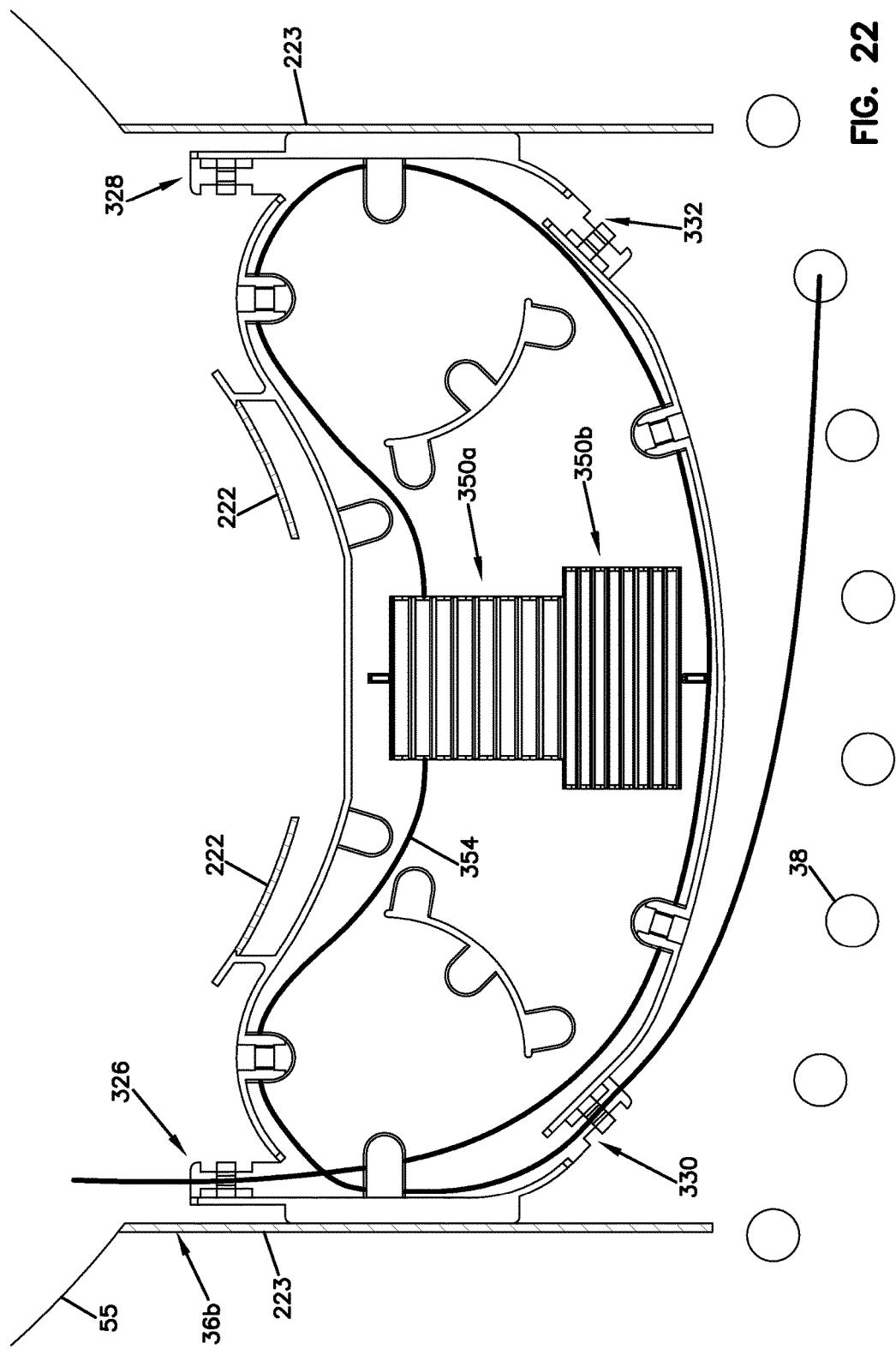
FIG. 22 is the same view as FIG. 20 showing a third fiber routing path.
Figure 23:
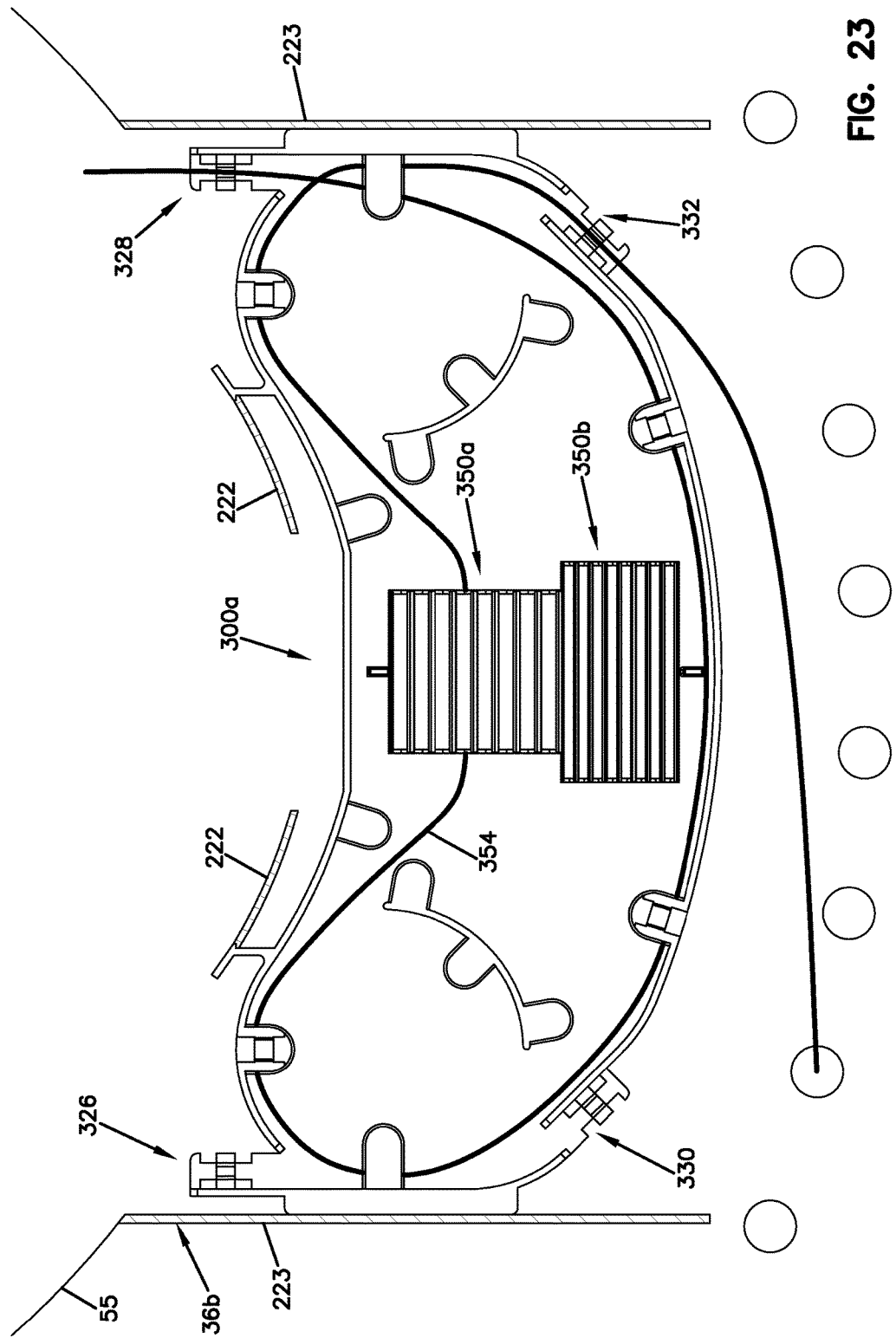
FIG. 23 is the same view as FIG. 20 showing a fourth fiber routing path.
Figure 24:
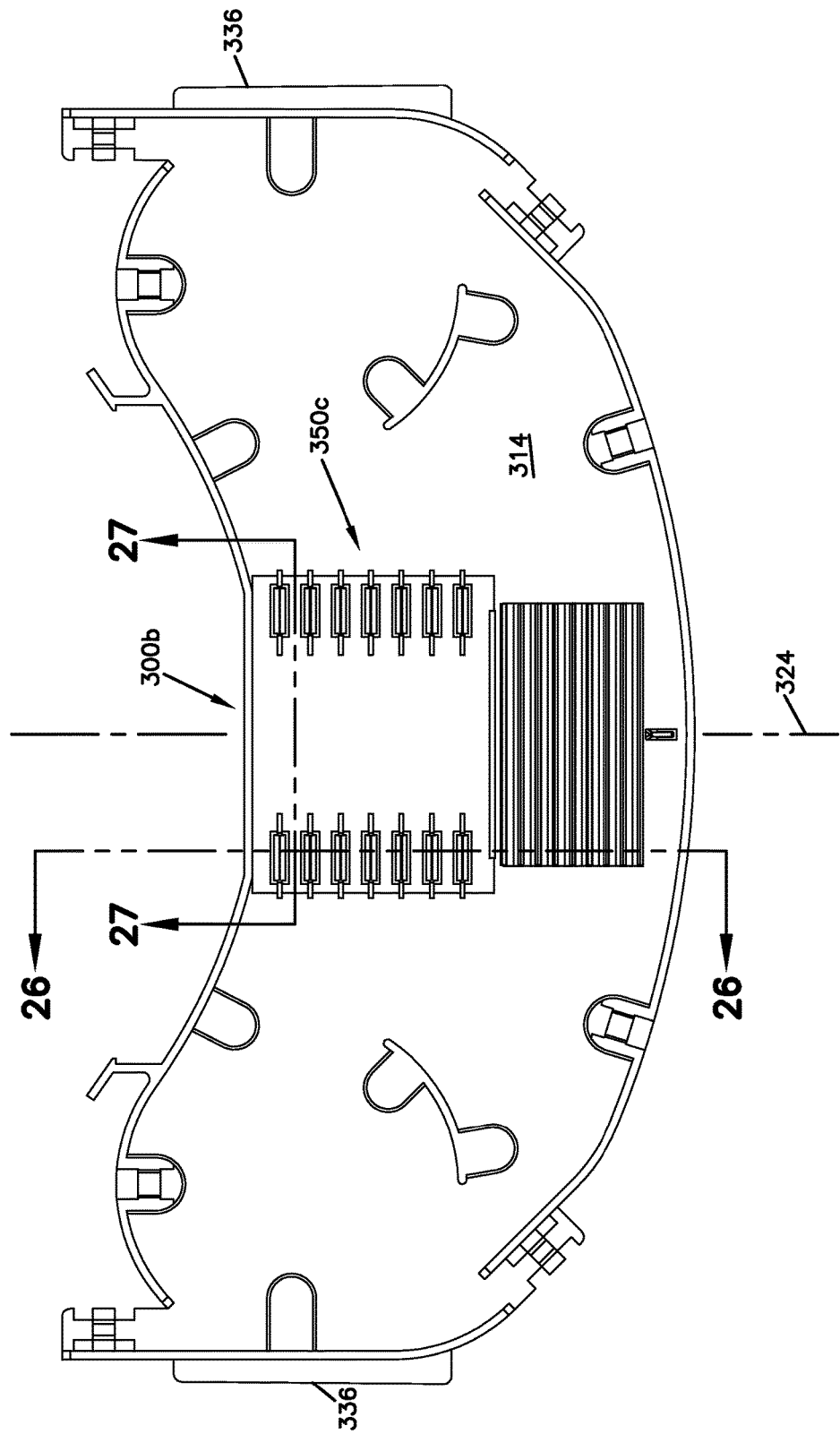
FIG. 24 is a plan view of a second component tray adapted for use with the closure of FIG. 1.
Figure 25:
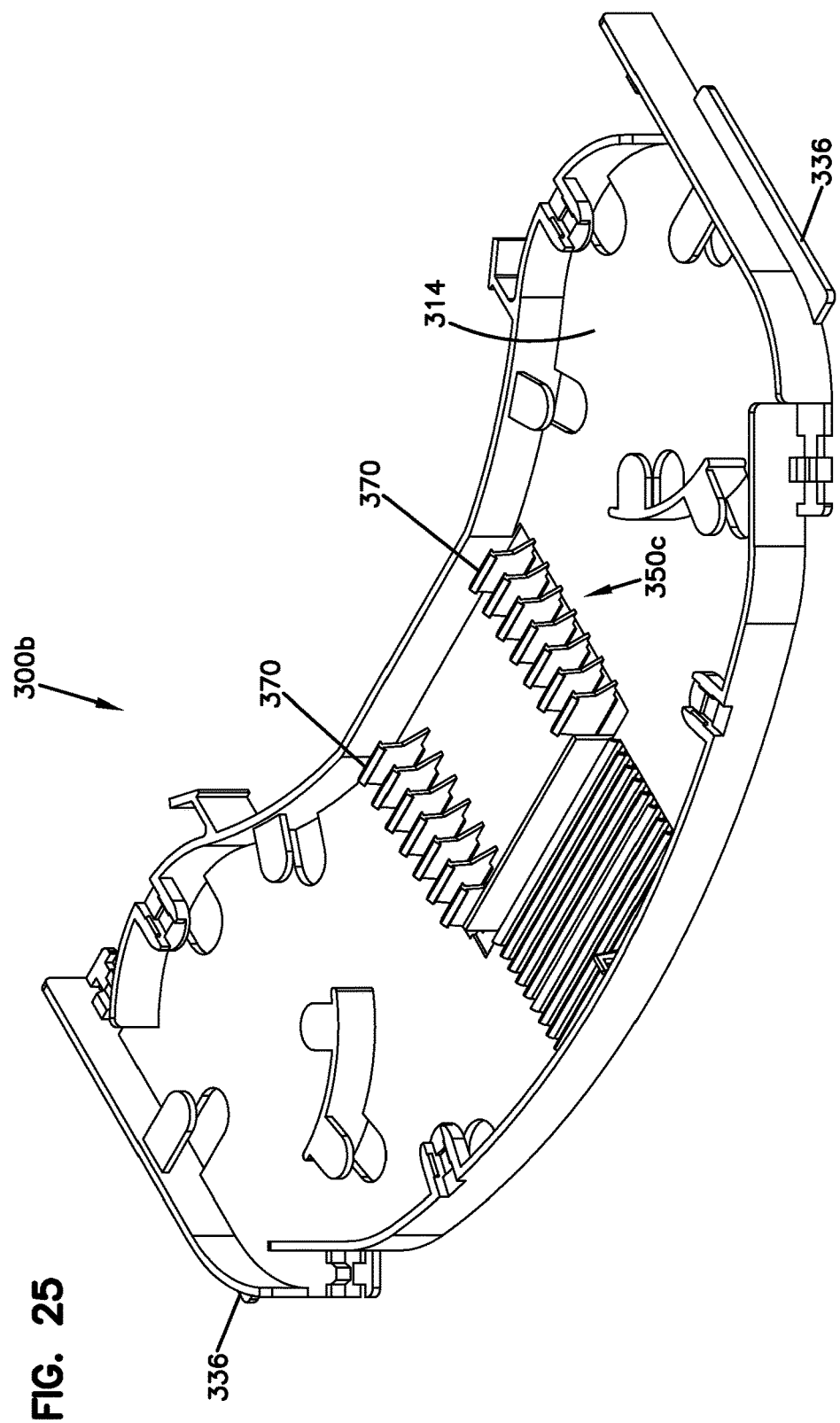
FIG. 25 is a perspective view of the component tray of FIG. 24.

Referring to FIGS. 20-23, component mounting locations 350a, 350b are positioned at a central region of the tray 300a and excess fiber storage locations 352 are positioned adjacent the ends of the tray 300a. The excess fiber storage locations 352 are adapted for storing optical fiber 354 in a looped/coiled configuration. The locations 352 are defined in part by inner surfaces of the perimeter wall arrangement 316 and in part by curved cable management walls 353 positioned within the fiber management space 318. The coils can be positioned inside or outside the walls 353 based on user preference. FIGS. 20-23 show various optical fiber routing schemes/paths in which optical fibers are routed from one of the fiber entrance/exit locations 326, 328 through one of the component mounting locations 350a, 350b to one of the fiber entrance/exit locations 330, 332. For ease of depiction, splits are not shown at the wavelength splitting components 304. However, it will be appreciated that multiple output fibers can be provided from each component 304 for each input fiber as shown at FIG. 10. All of the depicted routing schemes involve routing the fibers 354 around the inside of the perimeter of the tray 300a. Only FIG. 20 shows excess fiber being coiled at the locations 352. However, it will be appreciated that fiber can be similarly coiled in any of the routing schemes to accommodate excess fiber length. The angling of the fiber entrance/exit locations 330, 332 along orientations P3 and P4 facilitates routing fibers to adapters 38 located on opposite sides of the central axis 324 from the respective locations 330, 332 without violating minimum bend radius requirements of the optical fibers The component mounting locations 350a, 350b have a compact configuration adapted for securely attaching optical components to the tray 300a. The component mounting location 350a is adapted for mounting wavelength splitting components 304 to the tray 300a and the component mounting location 350b is adapted for mounting splice sleeves 302 to the tray 300a. The retention structures provided at the locations 350a, 350b are the same, except that the components provided at location 350a are larger than those provided at location 350b.

The retention structures provided at the component mounting locations 350a, 350b define a plurality of elongated pockets 392 (i.e., cavities, receptacles, component receiving locations, receptacles) having lengths aligned substantially perpendicular relative to the central axis 324. The pockets 392 of each location 350a, 350b are arranged in a row of pockets with the lengths of the pockets being substantially parallel to one another. Each of the pockets 392 is defined between two resilient retention members 394 that are substantially parallel to one another and that extend at least a majority of the length of the pocket 392. The resilient retention members 394 have cantilevered configurations with base ends 396 integrally formed (e.g., molded as one seamless piece) with the base 314. The resilient retention members have elastic/spring-like characteristics when bent about their base ends 396 in an orientation transverse to their lengths (e.g., orientation 395). The retention members 394 include concave sides 397 that face at least partially toward the base 314 (e.g., downwardly) and that overhang the pockets 392. The retention members 394 also include convex sides 398 that face away from the base 314 (e.g., upwardly). The concave sides 397 at least partially oppose the convex sides 398 of adjacent retention members 394 such that the sides 397, 398 cooperate to define lateral boundaries of the pockets 392. Through-slots 399 are defined through the base 314 at locations directly beneath the overhanging portions of the concave sides 397 of the retention members 394. The base 314 defines pocket beds 400 between the slots 399 and the convex sides 398 of the retention members 394. The pocket beds 400 include component support surfaces that are recessed relative to a main level 402 of the base 314. End shoulders 403 are defined at the interface between the component support surface and the main level 402.

To load an optical component into one of the component mounting locations 350a, 350b, the component is pressed between the concave side 397 and the convex side 398 of two adjacent retention members 394. As the component is inserted between the sides 397, 398, the retention members 394 elastically flex/deflect apart providing clearance for the component to enter the pocket. After the component passes a point of maximum deflection of the retention members 394, the component is forced toward the pocket bed 400 by the retention members 394 as the retention members 394 are elastically biased toward a retaining configuration (see FIG. 17) where the component is captured within the pocket. In certain embodiments, the retention position is a neutral position where the retention members 394 are not deflected. In other embodiments, the retention members 394 can be deflected when in the retention position to apply an elastic retention force to the component. When the component is seated in the pocket, the shoulders 403 limit axial movement of the component within the pocket (see FIG. 18).

FIGS. 24-31 show the tray 300b that is adapted to be mounted at the upper mounting positions of the radial extensions 36b. The tray 300b has the same basic configuration as the tray 300a except flanges 336 are located at a bottom side of the tray 300b such that the flanges can ride on top sides of the rails 223 when the tray is inserted into the upper position of one of the radial extensions 36b. Additionally, the tray 300b includes a component mounting location 350c adapted for securing rectangular components such as optical power splitters 303 to the tray 300b.

Figure 26:
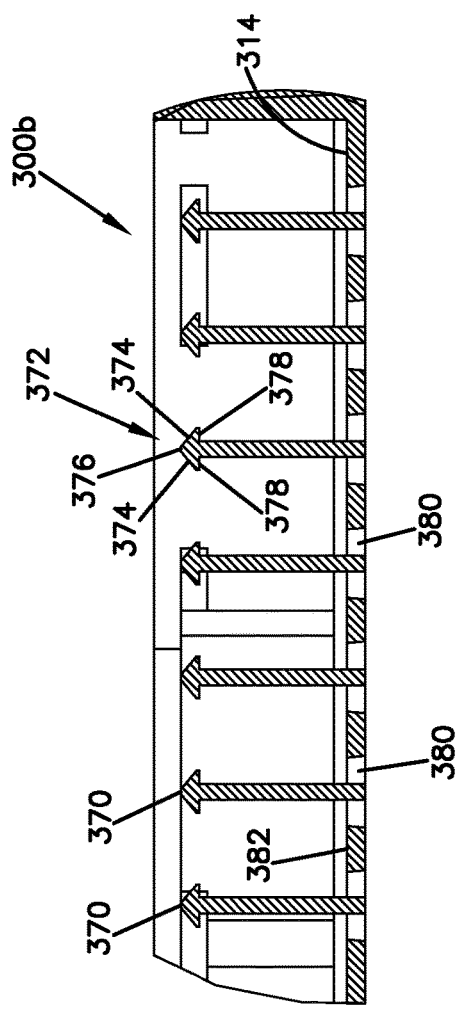
FIG. 26 is a cross-sectional view taken along section line 26-26 of FIG. 24.
Figure 27:
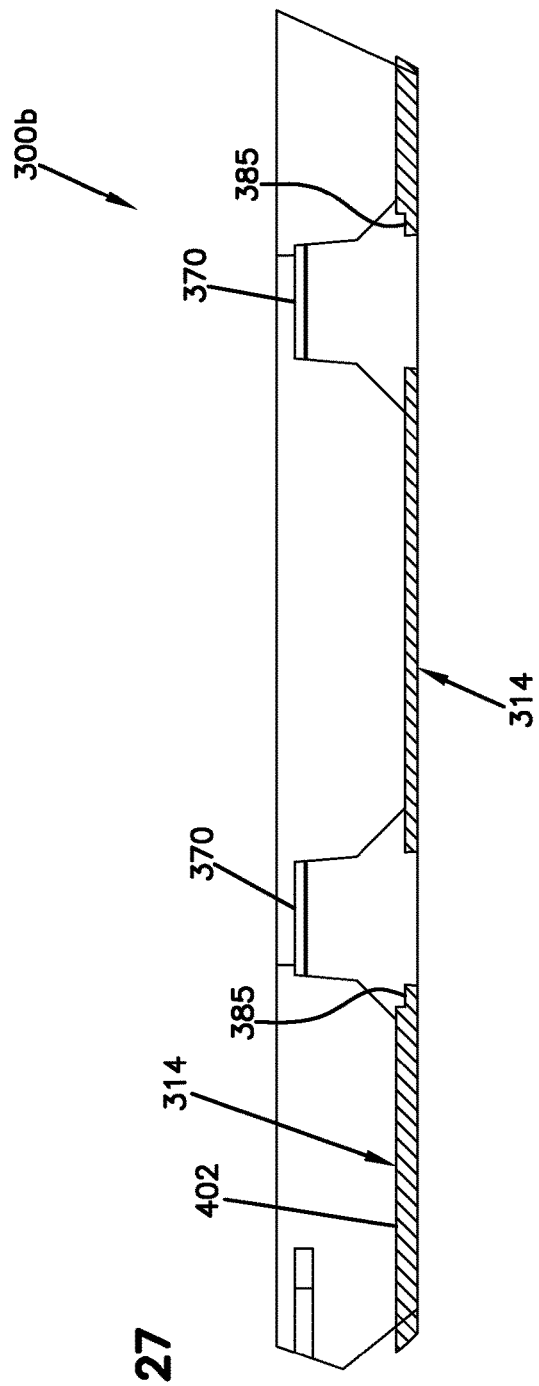
FIG. 27 is a cross-sectional view taken along section line 27-27 of FIG. 24.
Figure 28:
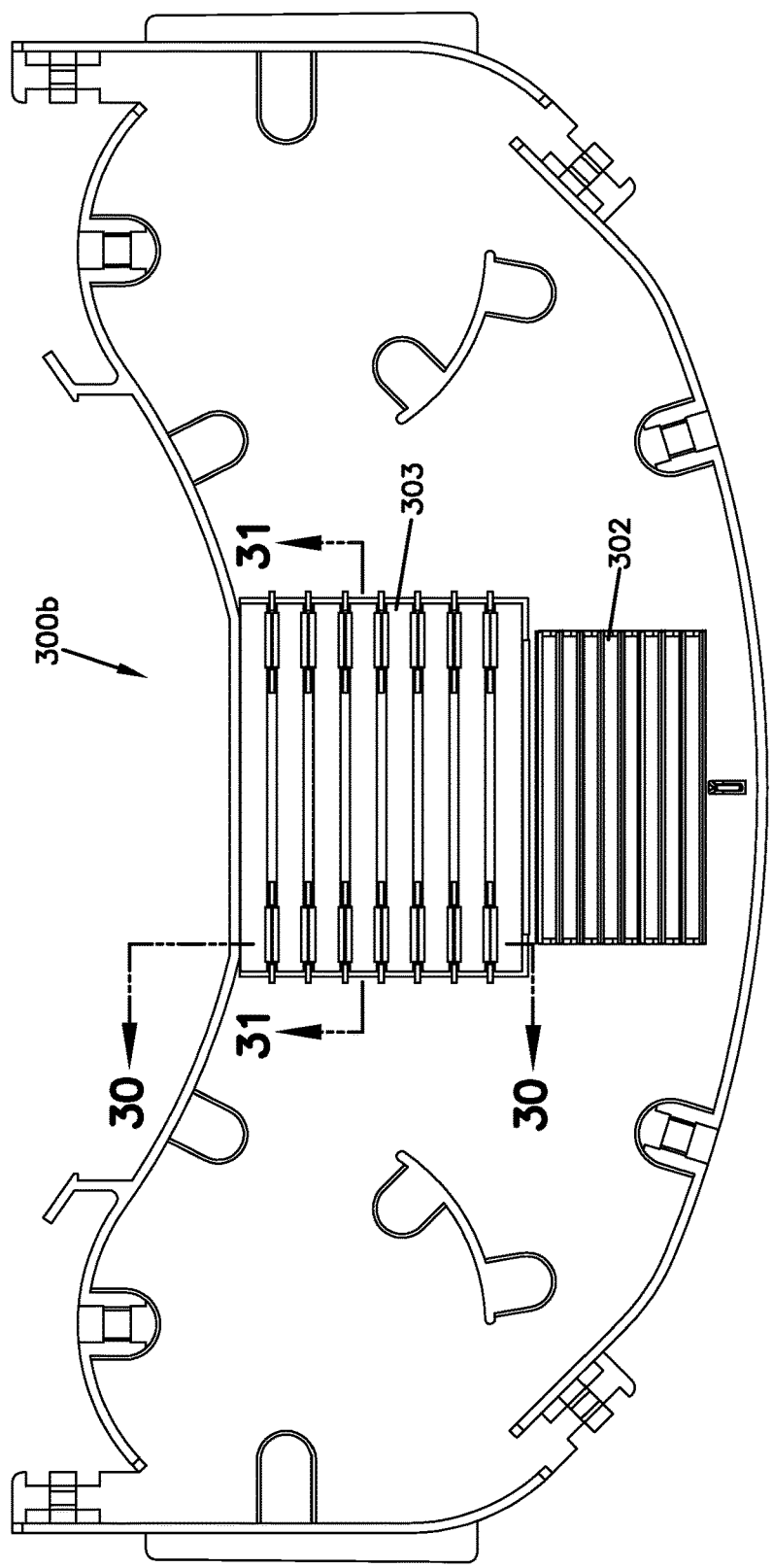
FIG. 28 is a plan view of the component tray of FIG. 24 with power splitting components and splicing components secured thereto.
Figure 29:
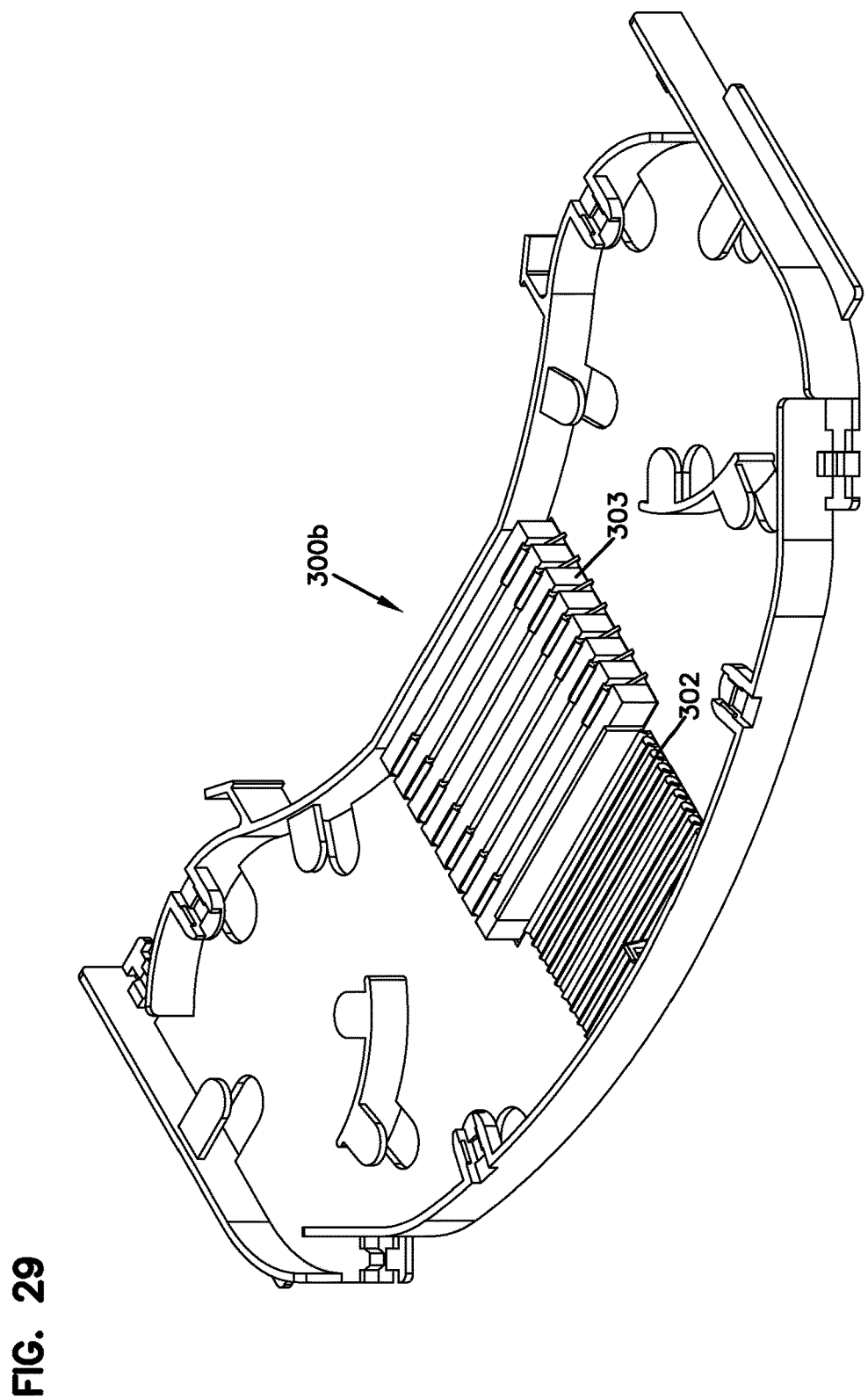
FIG. 29 is a perspective view of the component tray of FIG. 24 with power splitting components and splicing components secured thereto.
Figure 30:
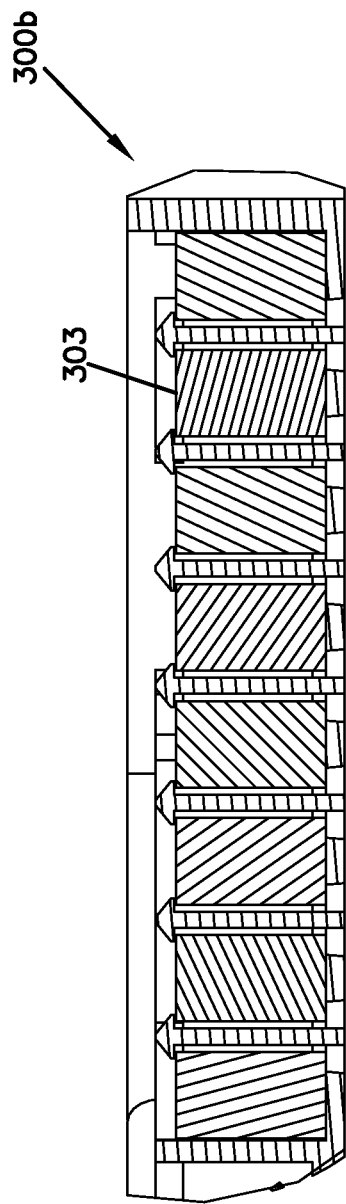
FIG. 30 is a cross-sectional view taken along section line 30-30 of FIG. 28.
Figure 31:
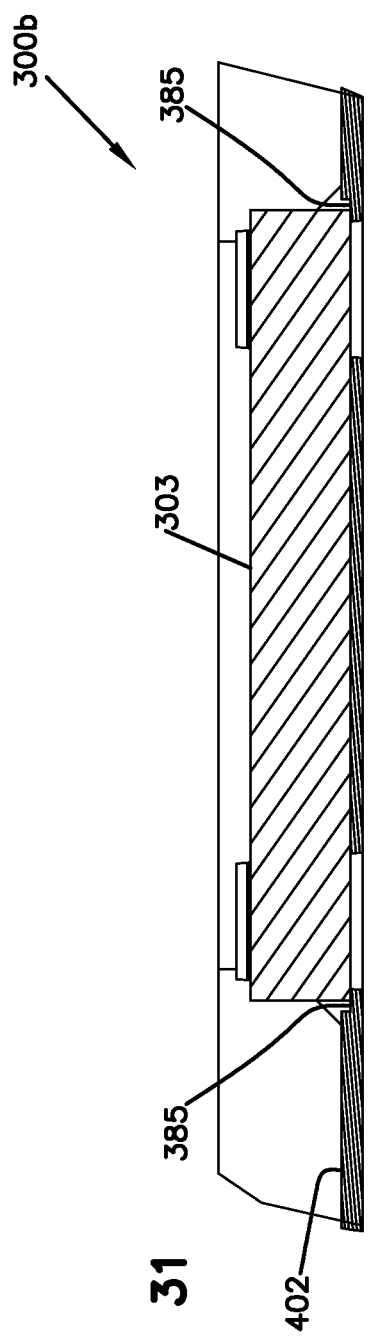
FIG. 31 is a cross-sectional view taken along section line 31-31 of FIG. 28.

The retention structures provided at the component mounting location 350c define a plurality of elongated pockets having lengths aligned substantially perpendicular relative to the central axis 324. The pockets are arranged in a row of pockets with the lengths of the pockets being substantially parallel to one another. Each of the pockets is defined between two pairs of resilient retention members 370. The resilient retention members 370 have cantilevered configurations with base ends integrally formed (e.g., molded as one seamless piece) with the base 314. The resilient retention members have elastic/spring-like characteristics when bent about their base ends in an orientation transverse to their lengths. As shown at FIG. 26, the retention members 370 include retention heads 372 each having two cam surfaces 374 that meet at an apex 376. The cam surfaces 374 face upwardly and outwardly and converge as they extend upwardly. Each retention head also includes a retention surface 378 positioned beneath each cam surface 374. The retention surfaces 378 face toward the base 314 (e.g., downwardly) and overhang pockets separated by the main cantilever body of each retention member 370. Through-slots 380 are defined through the base 314 at locations directly beneath the retention surfaces 378. The base 314 defines pocket beds 382 between the slots 380. The pocket beds 382 include component support surfaces (see FIG. 27) that are recessed relative to the main level 402 of the base 314. End shoulders 385 are defined at the interface between the component support surface and the main level 364.

To load an optical component into the component mounting locations 350c, the component is pressed between two of the retention members 370. As the component is pushed downwardly, the component engages the cam surfaces 374 positioned at opposite sides of the pocket causing the retention members 370 to deflect apart providing clearance for the component to enter the pocket. After the component passes a point of maximum deflection of the retention members 370, the component seats on the pocket bed 382 and the retention members 370 elastically move back toward a retaining configuration (see FIG. 30) where the component is captured within the pocket beneath the retention surfaces 378. When the component is seated in the pocket, the shoulders 385 limit axial movement of the component within the pocket (see FIG. 31).

While various integral component retention structures are disclosed, it will be appreciated that in other embodiments non-integral retention structures can be used as well.

Various aspects of the disclosure are shown with respect to a dome-style splice closure. In alternative embodiments, it will be appreciated that aspects of the present disclosure can be used with other types of closures such as in-line closures, or other types of closures.

The various embodiments disclosed herein have been described using directional terms (e.g., upper, lower, top, bottom, etc.) merely for ease of describing the relative positioning of the various parts. In practice, it will be appreciated that the embodiments disclosed herein can be used in any orientation. For example, for aerial applications, the enclosures described herein might typically be oriented horizontally (i.e., with the central axes extending horizontally). In contrast, for pole mount applications, the enclosures described herein might typically be oriented vertically (i.e., with the central axes extending vertically).

As used herein, the phrase "generally parallel" means parallel or almost parallel. Also, the phrase "generally perpendicular" means perpendicular or almost perpendicular.

From the foregoing detailed description, it will be evident that modifications and variations can be made in the devices of the disclosure without departing from the spirit or scope of the invention.

The invention claimed is:

1. A telecommunications enclosure system comprising:
   (a) an environmentally sealed main housing adapted to interface with one or more fiber optic cables; and
   (b) an expansion component adapted to mount in a sealed manner at an exterior of the main housing, the expansion component including a component housing enclosing an optical splitter or a wavelength division multiplexer.

2. The telecommunications enclosure system of claim 1 wherein:
   (a) the main housing has a cable entrance; and
   (b) the system further includes a cable sealing arrangement adapted to seal the cable entrance; the sealing arrangement including a sealing material.

3. The telecommunications enclosure system of claim 2 further comprising an actuator configured and arranged to cause the sealing material to be compressed and deform radially inwardly.

4. The telecommunications enclosure system of claim 1 wherein:
   (a) the main housing has a first housing piece and a second housing piece; and
   (b) the expansion component mounts between the first housing piece and the second housing piece.

5. The telecommunications enclosure system of claim 1 wherein the optical splitter comprises at least one of: a 1 by 2 splitter; a 1 by 4 splitter; a 1 by 8 splitter; a 1 by 16 splitters; or a 1 by 32 splitter.

* * * * *